(12) United States Patent
Parker et al.

(10) Patent No.: US 9,003,635 B2
(45) Date of Patent: Apr. 14, 2015

(54) INJECTION MOULDING METHOD

(75) Inventors: Kent Wallace Parker, Lower Hutt (NZ); Paul Michael Wilkinson, Wellington (NZ); Lyall Douglas Stewart, Porirua (NZ); Daryl Owen Neal, Lower Hutt (NZ); Gregory William Baum, Kapiti (NZ); Noah Juniper Rainbow McNeill, Kaiapoi (NZ)

(73) Assignee: Formway Furniture Limited, Wellington (NZ)

( * ) Notice: Subject to any disclaimer, the term of this patent is extended or adjusted under 35 U.S.C. 154(b) by 1118 days.

(21) Appl. No.: 12/936,673

(22) PCT Filed: Apr. 8, 2009

(86) PCT No.: PCT/NZ2009/000053
§ 371 (c)(1),
(2), (4) Date: Nov. 18, 2010

(87) PCT Pub. No.: WO2009/126051
PCT Pub. Date: Oct. 15, 2009

(65) Prior Publication Data
US 2011/0074201 A1 Mar. 31, 2011

Related U.S. Application Data

(60) Provisional application No. 61/043,283, filed on Apr. 8, 2008, provisional application No. 61/059,036, filed on Jun. 5, 2008.

(51) Int. Cl.
*B23P 17/00* (2006.01)
*B23P 25/00* (2006.01)
(Continued)

(52) U.S. Cl.
CPC ......... *B29C 45/0001* (2013.01); *B29C 45/2628* (2013.01); *B29C 45/0055* (2013.01); *B29K 2067/00* (2013.01); *B29L 2031/443* (2013.01)

(58) Field of Classification Search
USPC ............... 29/527.1, 527.2, 527.3; 297/452.1; 264/328.14, 328.12; 156/160
See application file for complete search history.

(56) References Cited

U.S. PATENT DOCUMENTS 3,086,242 A * 4/1963 Cook et al. .................... 264/566
3,370,112 A * 2/1968 Wray ........................... 264/456
(Continued)

FOREIGN PATENT DOCUMENTS

CN 1325337 A 12/2001
DE 200 06 038 U1 7/2000
(Continued)

OTHER PUBLICATIONS

Written opinion and International Search Report for PCT Application No. PCT/NZ2009/000053, Issued Aug. 21, 2009.
(Continued)

*Primary Examiner* — Jermie Cozart
*Assistant Examiner* — Bayan Salone
(74) *Attorney, Agent, or Firm* — Workman Nydegger

(57) ABSTRACT

A method of injection molding a polymeric resin to form an article that is suitable for strain orientation. A thermoplastic polyester elastomer polymeric resin is provided. The resin is heated to form a molten resin at a temperature of at least about 240° C. The molten resin is injected into a mold (22) to substantially fill the mold and form an article. At least part of the article is a sheet part with a plurality of members that are integrally formed into the sheet part, with apertures provided between at least some of the members of the sheet part of the article to form a mesh. At least the sheet part of the article is suitable for strain orientation.

34 Claims, 26 Drawing Sheets

(51) Int. Cl.
*A47C 7/02* (2006.01)
*B29C 45/00* (2006.01)
*B29B 7/00* (2006.01)
*B29C 45/26* (2006.01)
*B29K 67/00* (2006.01)
*B29L 31/44* (2006.01)

(56) References Cited

U.S. PATENT DOCUMENTS

| | | | |
|---|---|---|---|
| 3,498,950 A * | 3/1970 | Zimmer Jr. et al. | 528/176 |
| 3,578,730 A * | 5/1971 | Brinkmann et al. | 525/173 |
| 3,592,875 A * | 7/1971 | Brinkmann et al. | 525/172 |
| 4,102,868 A * | 7/1978 | Genetti et al. | 525/440.08 |
| 4,305,902 A * | 12/1981 | Uhlig | 264/211.12 |
| 4,374,796 A * | 2/1983 | Ogasawara et al. | 264/101 |
| 4,374,798 A * | 2/1983 | Mercer | 264/288.8 |
| 4,406,326 A * | 9/1983 | Wagner | 166/227 |
| 4,427,618 A * | 1/1984 | Sorensen | 264/328.9 |
| 4,519,976 A * | 5/1985 | Uhlig | 264/540 |
| 4,542,170 A * | 9/1985 | Hall et al. | 523/179 |
| 4,618,385 A * | 10/1986 | Mercer | 156/229 |
| 4,663,220 A * | 5/1987 | Wisneski et al. | 428/221 |
| 4,717,618 A * | 1/1988 | Tse et al. | 428/213 |
| 4,842,257 A * | 6/1989 | Abu-Isa et al. | 267/133 |
| 4,939,183 A * | 7/1990 | Abu-Isa et al. | 521/138 |
| 4,968,462 A * | 11/1990 | Hara | 264/40.1 |
| 5,023,039 A * | 6/1991 | Sorensen | 264/297.2 |
| 5,233,743 A * | 8/1993 | Robertson et al. | 29/527.1 |
| 5,676,894 A * | 10/1997 | Specht | 264/46.4 |
| 5,775,779 A * | 7/1998 | Abu-Isa et al. | 297/452.56 |
| 5,802,643 A * | 9/1998 | Sloot | 5/656 |
| 5,820,808 A * | 10/1998 | van Oene et al. | 264/328.12 |
| 6,010,760 A * | 1/2000 | Miyazaki et al. | 428/36.92 |
| 6,070,942 A * | 6/2000 | Barton et al. | 297/452.41 |
| 6,267,580 B1 * | 7/2001 | Leopold et al. | 425/557 |
| 6,540,950 B1 * | 4/2003 | Coffield | 264/257 |
| 6,579,937 B1 * | 6/2003 | Guntherberg et al. | 525/67 |
| 6,589,458 B2 * | 7/2003 | DeCost | 264/50 |
| 6,670,429 B2 * | 12/2003 | Appelman et al. | 525/444.5 |
| 6,726,285 B2 * | 4/2004 | Caruso et al. | 297/452.32 |
| 6,733,080 B2 * | 5/2004 | Stumpf et al. | 297/411.36 |
| 6,802,566 B2 * | 10/2004 | Prince et al. | 297/411.37 |
| 6,811,215 B2 * | 11/2004 | Horiki et al. | 297/228.1 |
| 6,842,959 B2 * | 1/2005 | Coffield et al. | 29/449 |
| 6,875,389 B2 * | 4/2005 | Straus et al. | 264/255 |
| 6,899,398 B2 * | 5/2005 | Coffield | 297/452.56 |
| 6,908,159 B2 * | 6/2005 | Prince et al. | 297/452.3 |
| 6,966,606 B2 * | 11/2005 | Coffield | 297/452.56 |
| 7,059,682 B2 * | 6/2006 | Caruso et al. | 297/452.46 |
| 7,096,549 B2 * | 8/2006 | Coffield | 29/91.5 |
| 7,107,678 B2 * | 9/2006 | Arai et al. | 29/888.4 |
| 7,159,293 B2 * | 1/2007 | Coffield et al. | 29/449 |
| 7,220,374 B2 * | 5/2007 | Zander et al. | 264/51 |
| 7,311,096 B2 * | 12/2007 | Gallops, Jr. | 124/23.1 |
| 7,441,758 B2 * | 10/2008 | Coffield et al. | 267/142 |
| 7,472,962 B2 * | 1/2009 | Caruso et al. | 297/452.46 |
| 7,695,660 B2 * | 4/2010 | Berrigan et al. | 264/211.12 |
| 7,985,192 B2 * | 7/2011 | Sheehan et al. | 602/7 |
| 8,029,060 B2 * | 10/2011 | Parker et al. | 297/300.1 |
| 8,087,727 B2 * | 1/2012 | Parker et al. | 297/300.2 |
| 8,096,615 B2 * | 1/2012 | Parker et al. | 297/284.3 |
| 8,162,403 B2 * | 4/2012 | Ito | 297/452.48 |
| 8,287,264 B2 * | 10/2012 | Matsumoto et al. | 425/143 |
| 8,680,167 B2 * | 3/2014 | Agarwal et al. | 521/48 |
| 2001/0021754 A1 * | 9/2001 | Weber et al. | 526/65 |
| 2001/0030457 A1 * | 10/2001 | Gregory | 297/440.11 |
| 2002/0013416 A1 * | 1/2002 | Noel, III | 525/191 |
| 2002/0020943 A1 * | 2/2002 | Leopold et al. | 264/328.14 |
| 2002/0077399 A1 * | 6/2002 | Kanai et al. | 524/294 |
| 2003/0001425 A1 * | 1/2003 | Koepke et al. | 297/452.56 |
| 2003/0105273 A1 * | 6/2003 | Appelman et al. | 528/272 |
| 2003/0171462 A1 * | 9/2003 | Anderson et al. | 524/110 |
| 2004/0012237 A1 * | 1/2004 | Horiki et al. | 297/440.11 |
| 2004/0032060 A1 * | 2/2004 | Yu | 264/328.15 |
| 2004/0140701 A1 * | 7/2004 | Schmitz et al. | 297/284.4 |
| 2005/0161156 A1 * | 7/2005 | Berrigan et al. | 156/285 |
| 2005/0279591 A1 * | 12/2005 | Coffield et al. | 188/131 |
| 2006/0103222 A1 * | 5/2006 | Caruso et al. | 297/452.15 |
| 2006/0267258 A1 * | 11/2006 | Coffield et al. | 267/140.5 |
| 2006/0286359 A1 * | 12/2006 | Coffield et al. | 428/216 |
| 2007/0063378 A1 * | 3/2007 | O'Donoghue | 264/219 |
| 2007/0123625 A1 * | 5/2007 | Dorade et al. | 524/423 |
| 2007/0202285 A1 * | 8/2007 | Burmaster et al. | 428/35.7 |
| 2007/0244242 A1 * | 10/2007 | Agarwal et al. | 524/439 |
| 2008/0290712 A1 * | 11/2008 | Parker et al. | 297/354.11 |
| 2009/0085388 A1 * | 4/2009 | Parker et al. | 297/311 |
| 2009/0218864 A1 * | 9/2009 | Parker et al. | 297/300.2 |
| 2011/0294955 A1 * | 12/2011 | Akiba | 525/173 |
| 2011/0309664 A1 * | 12/2011 | Parker et al. | 297/340 |
| 2012/0025574 A1 * | 2/2012 | Wilkinson et al. | 297/300.1 |
| 2012/0086251 A1 * | 4/2012 | Parker et al. | 297/285 |
| 2012/0091769 A1 * | 4/2012 | Parker et al. | 297/303.1 |

FOREIGN PATENT DOCUMENTS

| | | | | |
|---|---|---|---|---|
| DE | 10 2047 037361 A1 | 1/2005 | | |
| JP | 5-305628 | 11/1993 | | |
| WO | WO 98/16140 | 4/1998 | | |
| WO | WO 99/58022 | 11/1999 | | |
| WO | 2006/027763 A2 | 3/2006 | | |
| WO | WO 2006027763 A2 * | 3/2006 | | A61F 5/01 |
| WO | WO 2006065799 A2 * | 6/2006 | | |
| WO | WO 2007114232 A1 * | 10/2007 | | A47C 27/12 |
| WO | WO 2007/133458 | 11/2007 | | |
| WO | WO 2008/041868 | 4/2008 | | |

OTHER PUBLICATIONS

*DuPont Hytrel 6356*, XP002695423, Publication date unknown, pp. 4.

Supplementary European Search Report dated Apr. 25, 2013, issued in European Application No. 09729673.5.

Robert H. Marchessault et al., *Influence of Molecular Structure on the Dynamic Thermoelasticity of Polyphasic Polymer Systems*, Can. J. Chem., vol. 63 (1985), pp. 189-795.

E.I. du Pont de Nemours and Company, *DuPont Hytrel Thermoplastic Polyester Elastomer*, Hytrel 4069 Product Information, published at least as early as Apr. 8, 2009, 4 pages.

E.I. du Pont de Nemours and Company, *DuPont Hytrel Polyester Elastomer*, Product and Properties Guide, published at least as early as Apr. 8, 2009, 12 pages.

E.I. du Pont de Nemours and Company, *DuPont Hytrel Thermoplastic Polyester Elastomer*, Injection Molding Guide, published at least as early as Apr. 8, 2009, 37 pages.

PCT/NZ2009/000053, mail date Oct. 21, 2010, International Preliminary Report and Written Opinion.

* cited by examiner

INJECTION MOULDING METHOD

FIELD OF THE INVENTION

The invention relates generally to a method of injection moulding a polymeric resin to form an article. More particularly, the invention relates to a method of injection moulding a polymeric resin to form an article that is suitable for strain orientation.

BACKGROUND TO THE INVENTION

Injection moulding is a cost effective process for forming articles of manufacture in large numbers.

Conventional injection moulding techniques may not be suitable for forming a moulded sheet article with a plurality of cross-sectional features (that is, a moulded sheet article that is other than a constant cross-sectional thickness throughout the entire article). One example of such an article is a mesh sheet with apertures between the members of the mesh. In cross section, there are a plurality of members separated by a plurality of apertures. In some applications, such mesh articles need relatively fine members that are subsequently tensioned. Conventional injection moulding techniques may not provide a mesh article with fine enough members to provide desired resilience.

Some materials are suitable for strain orientation. Examples of suitable materials include some of the HYTREL materials available from Du Pont. In an as-formed HYTREL article, the polymer chains in the material are relatively random. By stretching the article, the polymer chains become relatively aligned. That phenomenon is strain orientation. Strain orientation changes the material properties. Typically, the material becomes stronger and more elastic; that is the elastic limit is increased in comparison to the as-formed material. Additionally, the article generally lengthens in the direction of stretching and reduces in cross-section.

While some forms of HYTREL can be injection moulded to form products in which strain orientation can occur, it has been generally understood that HYTREL cannot be injection moulded to form a mesh article in which strain orientation can occur. If the recommended HYTREL injection moulding conditions of a melt temperature of about 225° C. and a mould temperature of between 30° C. and 40° C. are followed, the members of the formed mesh article will generally break rather than strain orienting a useful amount.

While laser cutting of a solid sheet can be used to form a mesh article with apertures between the members, that is a more expensive method for manufacturing a large number of products.

It is an object of at least preferred embodiments of the present invention to provide a method of injection moulding a polymeric resin to form an article which is suitable for strain orientation, or to at least provide the public with a useful choice.

SUMMARY OF THE INVENTION

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

In accordance with a first aspect of the present invention, there is provided a method of injection moulding a polymeric resin to form an article that is suitable for strain orientation, the method comprising:

providing a polymeric resin comprising a thermoplastic polyester elastomer;

heating the resin to form a molten resin at a temperature of at least about 240° C.;

injecting the molten resin into a mould of a moulding apparatus to substantially fill the mould and form an article, wherein at least part of the article is a sheet part with a plurality of members that are integrally formed into the sheet part, with apertures provided between at least some of the members of the sheet part to form a mesh; and removing the formed article from the mould, wherein at least the sheet part of the article is suitable for strain orientation.

As used herein, a "polymeric resin" is a plastic raw material suitable for injection moulding by the method of the present invention. The resin may be a single plastic material, or may comprise a plurality of plastic materials.

Preferably, the thermoplastic polyester elastomer comprises a block copolymer. Preferably, the block copolymer comprises a hard segment and a soft segment. Preferably, the thermoplastic polyester elastomer is a block copolymer of polybutylene terephthalate and polyether glycol.

Preferably, the resin is selected such that the formed article, prior to strain orientation, has a hardness in the range of about 30D to about 55D when tested in accordance with ASTM D2240. More preferably, the resin is selected such that the formed article has a hardness in the range of about 30D to about 46D, preferably in the range of about 35D to about 45D, preferably in the range of about 36D to about 44D, more preferably in the range of about 37D to about 43D, more preferably in the range of about 38D to about 42D, more preferably in the range of about 39D to about 41D, most preferably about 40D.

The thermoplastic polyester resin is preferably one of HYTREL 4069, HYTREL 4556, HYTREL 5526, HYTREL 5556, HYTREL 3078. The resin may additionally include stabilisers and/or additives to achieve desired properties, for example to improve its resistance to UV light, fire, heat aging, moisture, and/or to make the resin a suitable colour.

It will be appreciated that the method of the present invention could be applied to any other resin having suitable properties.

Preferably, the resin is heated to a temperature of between about 240° C. and about 265° C., preferably between about 240° C. and about 255° C., more preferably between about 245° C. and about 255° C., more preferably between about 250° C. and about 255° C., most preferably about 255° C.

Preferably, the method comprises heating the mould to a temperature of at least about 50° C., preferably between about 50° C. and about 80° C., more preferably between about 50° C. and about 70° C., more preferably between about 55° C. and about 70° C., most preferably about 55° C. or about 70° C. Alternatively, the mould may be heated to a lower temperature.

Preferably, the step of injecting the molten resin comprises substantially filling the mould using an injection time of about 2.0 seconds or less, more preferably between about 1.0 seconds and about 2.0 seconds, most preferably of about 1.0, 1.1, about 1.2, about 1.3, about 1.4, about 1.5, about 1.6, about 1.7, about 1.8, about 1.9, or about 2.0 seconds.

For an article containing about 58 cm$^3$ of resin for example, the flow rate of resin in the mould is preferably an average of at least about 29 cm$^3$/second, more preferably between about 29 cm$^3$/second and about 58 cm$^3$/second, most preferably of about 58 cm$^3$/second, 52.7 cm$^3$/second, about 48.3 cm$^3$/second, about 44.6 cm$^3$/second, about 41.4 cm$^3$/second, about 38.7 cm³/second, about 36.3 cm³/second, about 34.1 cm³/second, about 32.2 cm³/second, about 30.5 cm³/second, or about 29 cm³/second. For a larger article, the flow rate may be within the same range (meaning the mould takes longer to fill), or alternatively may be faster so the mould may be filled in substantially the same time. For example, for an article containing about 573.2 cm³ of resin, to achieve the same injection time, the flow rate of material may be an average of at least about 286.6 cm³/second, more preferably between about 286.6 cm³/second and about 573.2 cm³/second, most preferably of about 573.2 cm³/second, about 521.1 cm³/second, about 477.7 cm³/second, about 440.9 cm³/second, about 409.4 cm³/second, about 382.1 cm³/second, about 358.3 cm³/second, about 337.2 cm³/second, about 318.4 cm³/second, about 301.7 cm³/second, or about 286.6 cm³/second. For a smaller article, the flow rate may be within the same range (meaning the mould takes a shorter time to fill), or alternatively may be slower so the mould may be filled in substantially the same time.

Preferably, the step of injecting the molten resin comprises using an injection pressure of at least about 80 MPa to substantially fill the mould. Preferably, the injection pressure is at least about 100 MPa, preferably at least about 120 MPa. The injection pressure is preferably between about 80 MPa and about 135 MPa, preferably between about 80 MPa and about 132 MPa. For a smaller part, the injection pressure may be between about 80 MPa and about 100 MPa, and for a larger part the injection pressure may be between about 100 MPa and about 132 MPa, preferably between about 120 MPa and about 132 MPa.

Preferably, the mould comprises at least one gate, and the step of injecting the molten resin comprises injecting at least a major part of the molten resin with a velocity of at least about 1000 mm/second at the or each gate, preferably between about 1000 mm/second and about 2000 mm/second, preferably between about 1500 mm/second and about 2000 mm/second.

The injection pressure, time, flow rate, and velocity may depend on the size of the article to be made. For example, an injection pressure of about 120 MPa may be suitable for manufacturing a membrane that forms a cover for a back portion or seat portion of a chair. To make a smaller article, the pressure and velocity may be reduced and the same mould fill time used. Alternatively, the pressure and velocity may remain the same, but a shorter fill time achieved. Similarly, for a larger article, the pressure and velocity may be increased and the same fill time used, or the pressure and velocity may remain the same, but a longer fill time achieved.

Preferably, the moulding apparatus comprises a nozzle to inject the molten resin into the mould, and a heater adjacent the nozzle, and the method comprises passing the molten resin through the nozzle at a temperature of at least about 240° C. Preferably, the method comprises passing the molten resin through the nozzle at a temperature of between about 240° C. and about 265° C. Preferably, the method comprises passing the molten resin through the nozzle at a temperature of between about 240° C. and about 255° C. Preferably, the method comprises passing the molten resin through the nozzle at a temperature of between about 245° C. and about 255° C. Preferably, the method comprises passing the molten resin through the nozzle at a temperature of between about 250° C. and about 255° C. Preferably, the method comprises passing the molten resin through the nozzle at a temperature of about 255° C.

Preferably, the method comprises holding the resin in the mould at a hold pressure during curing of the article, wherein the hold pressure is lower than an injection pressure used during the step of injecting the molten resin. The resin may be held in the mould at a relatively low hold pressure to at least partly cure, such as less than about 22 MPa for example, preferably between about 5.5 and about 22 MPa. Alternatively, the resin may be held at a higher pressure.

Preferably, the resin pressure is transitioned in a controlled manner from the higher injection pressure to the lower hold pressure, to minimise movement of resin into or out of the mould during curing of the article. Preferably, the transition comprises a plurality of pressures that step down from the injection pressure to the hold pressure. Preferably, the hold pressure is sufficient to provide inward flow of only a sufficient amount of resin into the mould to compensate for shrinkage of the article during curing.

Any one or more of the above parameters could be used in combination. In a most preferred embodiment, the moulding method comprises using all of the above parameters.

The sheet part of the formed article may have a plurality of elongate members extending in a first generally longitudinal direction, and a plurality of elongate members extending in a second direction that is generally transverse to the first generally longitudinal direction, for example. Alternatively, the members may be oriented in any suitable way relative to one another.

Preferably, the generally transversely extending elongate members differ from the generally longitudinally extending elongate members. Preferably, at least a majority of the generally transversely extending elongate members are thinner in a longitudinal direction of the article than at least a majority of the generally longitudinally extending elongate members are in a transverse direction of the article. Preferably, at least a majority of the generally transversely extending elongate members have a cross-sectional dimension of about 2.5 mm or less.

Preferably, at least some of the elongate members of the formed article have a cross-sectional dimension of about 10 mm or less, more preferably of about 5 mm or less, more preferably of about 2.5 mm or less. Preferably, at least a majority of the elongate members of the formed article have a cross-sectional dimension of about 10 mm or less, more preferably of about 5 mm or less, more preferably of about 2.5 mm or less. Preferably, at least some of the elongate members have a cross-sectional dimension of about 2 mm.

In a preferred embodiment, the depth of the sheet part is about 2.5 mm, the generally transversely extending members have a cross-sectional width (in the longitudinal direction) of about 2 mm, and the generally longitudinally extending members have a cross sectional width (in the transverse direction) of about 10 mm or less.

Preferably, the resin is injected into the mould from points adjacent opposite ends of a mould cavity, and the generally longitudinally extending elongate members are substantially aligned with the direction between the opposite ends of the mould cavity.

Apertures are provided between at least some of the members in the sheet part of the article to form a mesh. The apertures could be any suitable size, shape, and configuration. The sheet part of the article may have some solid portions such as webs between members. Preferably, apertures are provided between at least a majority of the members in the sheet part. Preferably, apertures are provided between all of the members in the sheet part.

It will be appreciated that the entire article may be formed as a sheet. In such an embodiment, references above to "sheet part" can apply to the whole article. Preferably, at least a major part of the article is formed as a sheet.

Alternatively, only part of the article may be formed as a sheet, and the article may additionally be provided with a non-sheet part or parts. By way of example only, the article may be provided with attachment features that are integrally moulded into the article.

The sheet part of the formed article may have one or more profile features formed as part of the moulding process. Preferably, at least part of the article has a curved profile that is formed as part of the moulding process. By way of example only, at least part of the article may have a curved side profile and/or a curved top profile that is formed as part of the moulding process. As an alternative, the article may be substantially flat. Only the sheet part of the article may have one or more profile features, or the entire article may have one or more profile features.

Preferably, at least part of the sheet part of the formed article is capable of being stretched to at least about 500%, preferably at least about 600%, more preferably at least about 700%, more preferably at least about 800%, most preferably at least about 900%, of an initial dimension without failure, such that strain orientation occurs.

The article may be fully cured within the mould. Alternatively, the article may be cured a sufficient amount in the mould to allow it to substantially hold its shape, but may be fully cured externally of the mould.

The article may be a support surface for a chair. For example, the article may be a back membrane or seat membrane for a chair that is subsequently mounted to a frame to support the membrane to form a compliant suspended support surface. However, the method may be used to form any other suitable type of article.

In accordance with a second aspect of the present invention, there is provided a formed article made by the method outlined in relation to the first aspect above.

In accordance with a third aspect of the present invention, there is provided a method of assembling a support, comprising: providing a frame; providing a formed article made by the method outlined in relation to the first aspect above, wherein the formed article has an as-moulded dimension less than a corresponding dimension of the frame; stretching at least part of the sheet part of the formed article so as to have a stretched dimension greater than the corresponding dimension of the frame and such that strain orientation of at least that part of the formed article occurs; relaxing the formed article so as to have a post-relaxation dimension between the as-moulded dimension and the stretched dimension; and supporting the formed article from the frame.

The formed article may be any of the types outlined in relation to the first aspect above. The article may have a plurality of generally longitudinally extending elongate members, and a plurality of generally transversely extending elongate members. Alternatively, the members may be oriented in any suitable way relative to one another.

In one embodiment, the article has a plurality of generally transversely extending elongate members, and a plurality of generally longitudinally extending elongate members. Preferably, the generally transversely extending elongate members differ from the generally longitudinally extending elongate members. Preferably, the generally transversely extending elongate members are thinner in a longitudinal direction of the article than the generally longitudinally extending elongate members are in a transverse direction of the article. Preferably, said dimension is a transverse dimension, and the method is such that the generally transversely extending elongate members are stretched and then relaxed as the article is stretched and relaxed. Alternatively, said dimension may be a longitudinal dimension, and the method is such that the generally longitudinally extending elongate members are stretched and then relaxed as the article is stretched and relaxed.

At least some of the generally longitudinally extending elongate members may have a greater depth than at least some of the generally transversely extending elongate members. For example, a generally centrally disposed plurality of the generally longitudinally extending elongate members may have a greater depth than the generally transversely extending elongate members. The generally centrally disposed plurality of the generally longitudinally extending elongate members may have a greater depth than the remaining generally longitudinally extending elongate members. Other configurations could be provided. Alternatively or in addition, at least some of the generally longitudinally extending elongate members may project further forward in one direction than at least some of the generally transversely extending elongate members.

The article may be stretched and relaxed in both the transverse and longitudinal dimensions, or in any other suitable direction. The step of stretching may comprise stretching the article in 360°. That is particularly useful if the article comprises an irregular pattern of members and/or diagonal members.

The method may comprise stretching and relaxing the entire article, or may comprise stretching and relaxing part of the article. That is, in the finished support, some parts of the article may have been strain oriented, and other parts may not have been strain oriented. Further, where part of the article is sheet form and part is not sheet form, all or part of the sheet part of the article may have been strain orientated, and the remainder of the article will generally not have been strain oriented.

Depending on the material used, in one embodiment the stretched dimension may be between about 1.4 and about 2.9 times the as-moulded dimension, and preferably about 2.15 times the as-moulded dimension. Each strand (between adjacent transverse members) of the elongate members oriented in the stretching direction is preferably stretched to between about 3 and about 10 times, preferably to between about 3 and about 9 times, preferably to between about 3 and about 8 times, preferably to between about 5 and about 10 times, preferably to between about 5 and about 9 times, preferably to between about 5 and about 8 times its as-moulded length.

Preferably, the post-relaxation dimension of the article is between about 1.1 and about 1.75 times the as-moulded dimension, preferably about 1.2 times the as-moulded dimension. The post-relaxation length of each strand (between adjacent transverse members) of the elongate members oriented in the stretching direction is preferably between about 1.5 and about 4.5 times its original length, more preferably about 2.1 times its original length.

The step of relaxing and supporting may occur concurrently. For example, the article may comprise pockets or the like to capture respective parts of the frame, and the parts may be captured by the pockets as the article is relaxed. Alternatively, the article may be connected to the frame after relaxing the article. For example, following relaxing of the article, the article may be stretched a small amount and then supported from the frame. The stretched dimension for supporting the article from the frame is preferably about 1.4 times its as-moulded dimension.

The article may be directly connected to the frame such as by portions of one of the article and the frame being received in respective complementary recesses of the other of the article and the frame. For example, the article may be provided with enlarged heads around at least part of its periphery, that are received in recesses in the frame to connect the article to the frame. Alternatively, separate fasteners could be used to connect the article and the frame. As another alternative, one or more retaining strips could be used to connect the article to the frame. Preferably, the article is directly connected to the frame by attachment features that are integrally moulded with the article as part of the moulding process. The part of the article having the integral attachment features would generally not be strain oriented.

The method may further comprise abrading at least a surface of the article to provide a napped surface. The abrading will occur following moulding, and may occur prior to or following the stretching or relaxing step.

In a preferred embodiment, a surface texture is inmolded on the article as part of the moulding method.

The method may comprise stretching different parts of the article different amounts, to obtain varying properties in the article.

Preferably, the frame comprises an opening that is at least partly bounded by frame members, and the method comprises supporting the formed article from the frame with part of the formed article extending across the opening, to form a compliant suspended support surface. For example, the frame may comprise side members and upper and lower members (or front and rear members in the case of a seat frame), and the members may bound one or more openings that are covered by the cover when supported by the frame.

The support may be a back portion of a chair. In accordance with a fourth aspect of the present invention, there is provided a back portion for a chair when assembled using the method of the third aspect.

Alternatively, the support may be a seat portion for a chair. In accordance with a fifth aspect of the present invention, there is provided a seat portion for a chair when assembled using the method of the fourth aspect.

The chair may be any suitable form of chair. For example, the chair may be an office chair. The chair could be a different type of chair, including but not limited to a vehicle seat such as a car seat, aircraft seat, or boat seat, or a lounge chair or theatre chair.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The invention consists in the foregoing and also envisages constructions of which the following gives examples only.

BRIEF DESCRIPTION OF THE DRAWINGS

In order that the invention may be more fully understood, some embodiments will now be described by way of example with reference to the accompanying figures in which:

FIG. 2b is a perspective view of a heated manifold assembly for use with the mould part of FIG. 2a;

FIG. 2c is a perspective view of a mating mould part to be used with the part shown in FIG. 2a;

DETAILED DESCRIPTION OF PREFERRED FORMS

Figure 1:
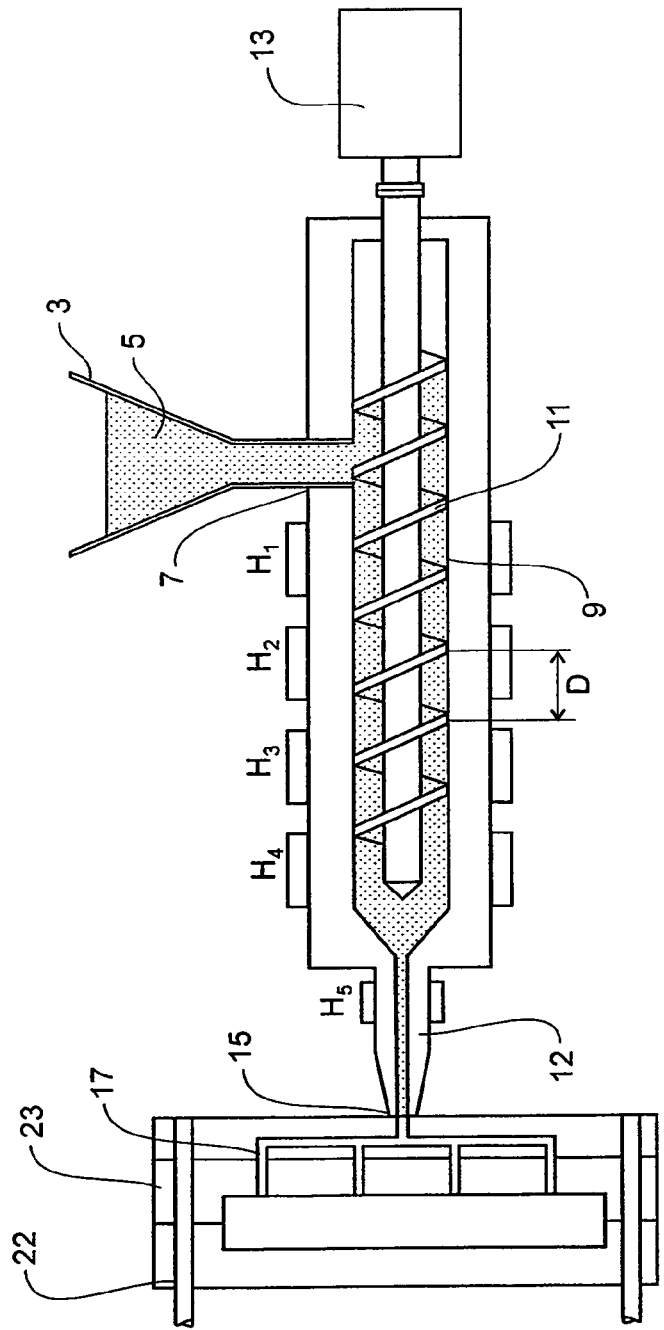
FIG. 1 is schematic view of an injection moulding apparatus used in the moulding method of the present invention.

Preferred moulding apparatus and method Referring to FIG. 1, a preferred form injection moulding apparatus 1 has a hopper 3 for receipt of a polymeric resin 5. The resin 5 may be any plastic raw material suitable for injection moulding by the method of the present invention. The resin may be a single plastic material, or may comprise a plurality of plastic materials.

In the preferred form, the material is a thermoplastic polyester elastomer. Preferably, the thermoplastic polyester elastomer is a block copolymer comprising a hard (crystalline) segment of polybutylene terephthalate and a soft (amorphous) segment based on long chain polyether glycols. Preferably, the thermoplastic polyester elastomer resin is selected such that the article formed by the moulding method, once fully cured and prior to strain orientation, has a hardness in the range of about 35D to about 55D when tested in accordance with ASTM D2240. More preferably, the thermoplastic polyester elastomer resin is selected such that the article has a hardness in the range of about 30D to about 46D, more preferably in the range of about 35D to about 45D, preferably in the range of about 36D to about 44D, more preferably in the range of about 37D to about 43D, more preferably in the range of about 38D to about 42D, more preferably in the range of about 39D to about 41D, most preferably about 40D.

The thermoplastic polyester resin is preferably one of HYTREL 4069, HYTREL 4556, HYTREL 5526, HYTREL 5556, HYTREL 3078. Most preferably, the resin is HYTREL 4069. The resin may additionally include stabilisers and/or additives to achieve desired properties, for example to improve its resistance to UV light, fire, heat aging, moisture, and/or to make the resin a suitable colour.

The method of the present invention could be applied to any other resin having suitable properties. The resin will typically be in a pellet or granular form, and is poured into the hopper 3. Prior to pouring the material into the hopper 3, or alternatively after pouring the material into the hopper but prior to delivering the material from the base of the hopper 7 into the chamber 9 containing a screw 11 for moving the resin, the resin is dried at an elevated temperature to remove residual moisture from the resin. In the case of HYTREL 4069 for example, the material may be dried at a temperature of 100° C. for a time period of four hours. Any other suitable time and temperature could be used.

The screw 11 is driven by a motor 13, which causes the screw to rotate about an axis extending along the screw. The depth D of the screw flights will typically reduce toward the end of the screw proximal the mould and distal the hopper, to compress the resin that is being moved along the screw. The screw serves two purposes. First, the screw delivers the resin to be injected into the mould. Second, as the resin is moved along the screw, the resin is melted to form a molten resin. That is partly caused by friction and pressure applied by the screw to the resin, and partly caused by heaters.

In the form shown, the apparatus has a suitable number of heaters or heat exchangers $H_1$, $H_2$, $H_3$, $H_4$, $H_5$ spaced along the chamber 9, to assist in melting the resin and controlling the temperature of the resin as it is passed along the chamber 9. In the form shown, the apparatus has five heaters. Four of the heaters surround the chamber containing the screw, and the fifth heater is positioned adjacent the nozzle 12 that injects the molten material into the sprue bush 15 of the mould. Generally, the temperatures of the heaters will progressively increase from the heater most proximal the hopper to the heater most distal the hopper. The temperature of the resin in the chamber and nozzle will preferably correspond substantially to the temperature of an associated heater.

In a preferred form, the final heater $H_5$ may be at a temperature of at least about 240° C., preferably between about 240° C. and about 265° C., more preferably between about 240° C. and about 255° C., more preferably between about 245° C. and about 255° C., more preferably between about 250° C. and about 255° C., most preferably about 255° C. That means the resin, when it is injected from the nozzle into the sprue bush 15 will have a corresponding temperature of at least about 240° C., preferably between about 240° C. and about 265° C., more preferably between about 240° C. and about 255° C., more preferably between about 245° C. and about 255° C., more preferably between about 250° C. and about 255° C., most preferably about 255° C. The initial heater $H_1$ may be at any suitable temperature, and will generally be at a lower temperature than final heater $H_5$. The actual temperature of the initial heater will depend on the residence time for the resin in the barrel. Typically, the initial heater temperature may be about 15 to about 20° C. lower than the final heater temperature.

Figure 2B:
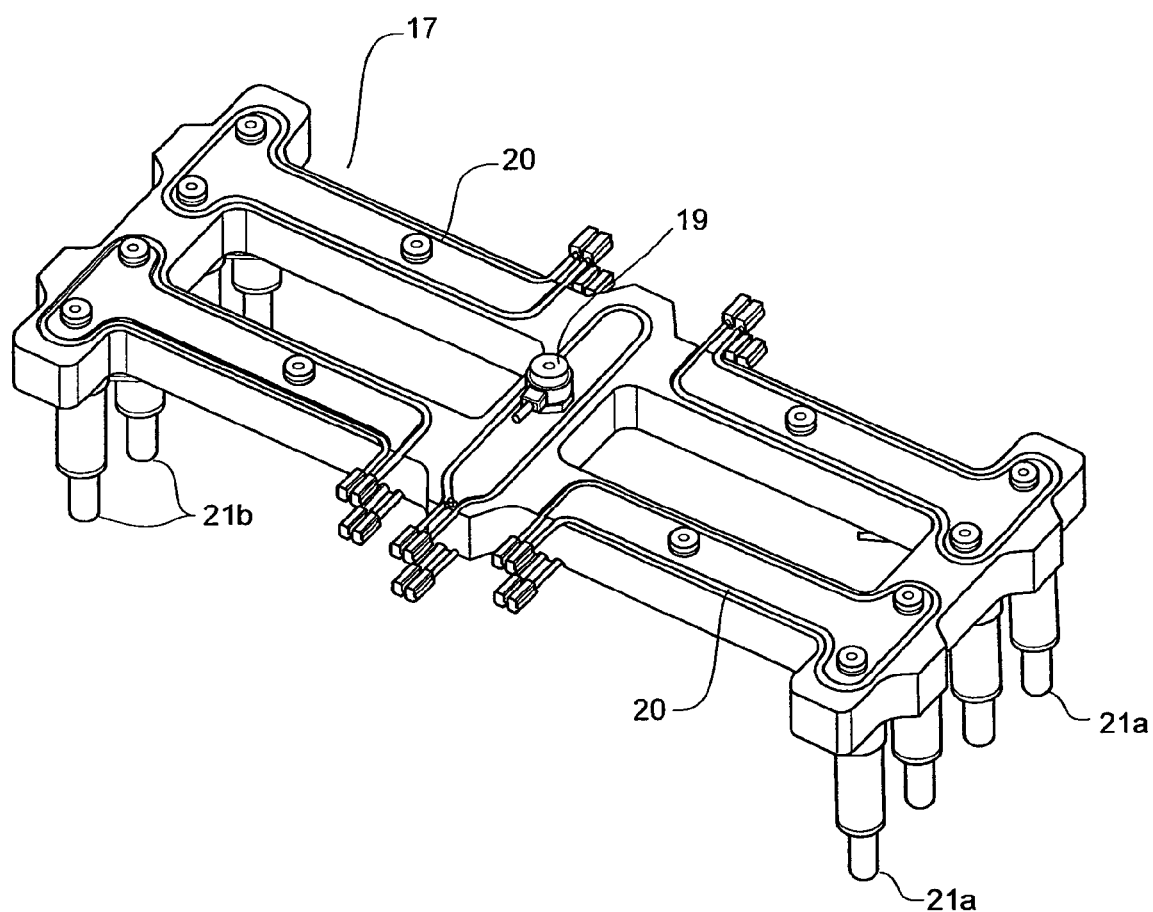
Figure 3:
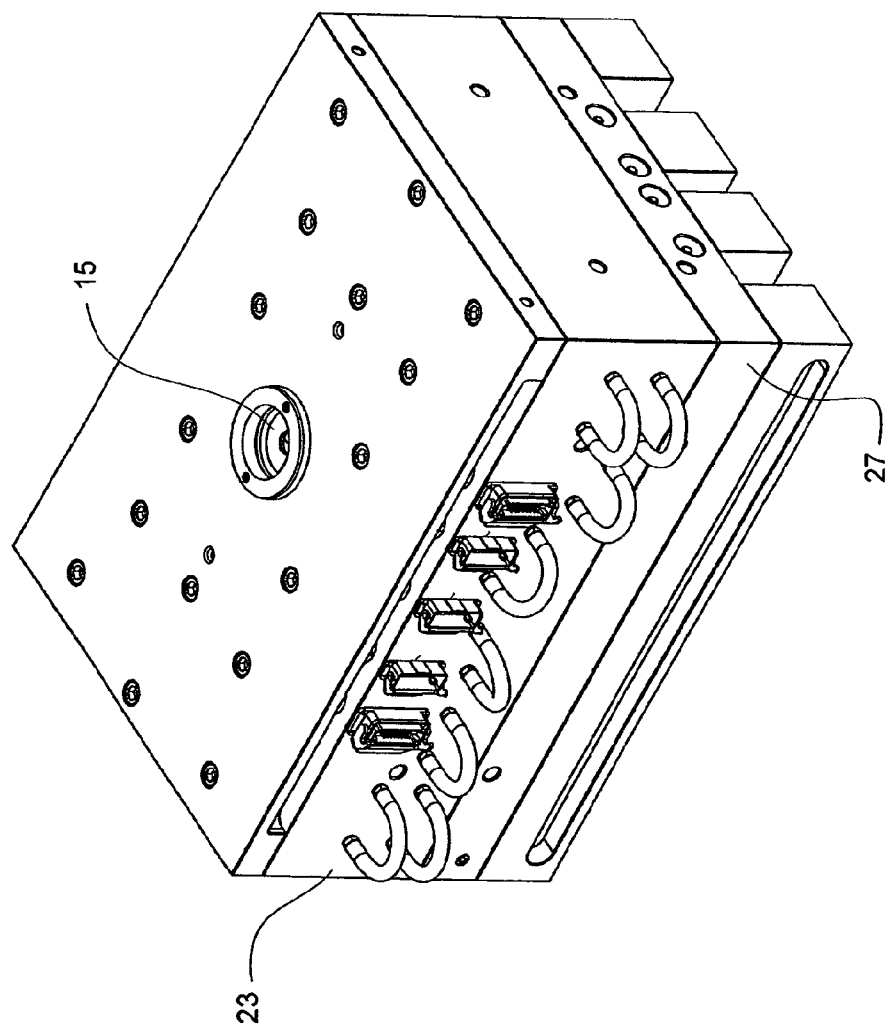
FIG. 3 is a perspective view of a mould assembly comprising the mould parts of FIGS. 2a and 2c, and the manifold assembly of FIG. 2b.

The sprue bush 15 is shown in more detail in FIG. 3. A manifold assembly 17 as shown in FIG. 2b is in fluid connection with the sprue bush 15. The manifold assembly 17 has an inlet 19 that provides a passage with the sprue bush 15. The inlet 19 is in fluid connection with a plurality of outlets 21a, 21b of the manifold assembly, so that molten resin that is driven into the sprue bush 15 by the screw 11 and nozzle is distributed to the manifold outlets 21a, 21b. In the form shown, the manifold assembly has two spaced apart sets of outlets 21a, 21b, with each set of outlets comprising four outlets. It will be appreciated that the manifold assembly may have any suitable number of outlets in any suitable configuration. The spaced apart outlets are preferred, as they enable the resin to be injected into the mould tool from two spaced apart positions.

Figure 2A:
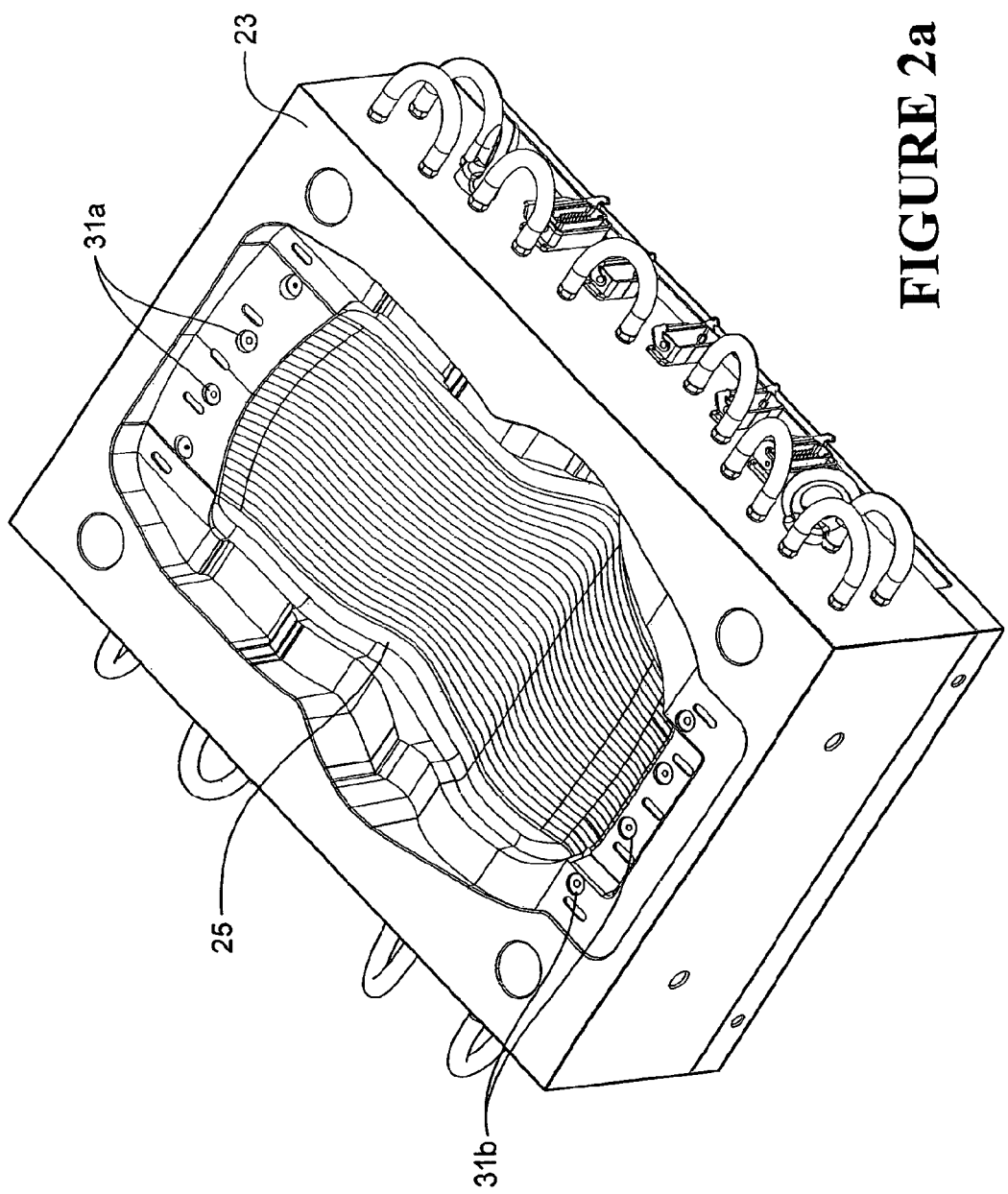
FIG. 2a is a perspective view of one part of a mould part for use in the injecting moulding apparatus.

FIG. 2a shows one part 23 of the mould. This mould part contains a large generally recessed cavity section 25 in the shape of the article to be formed. The mould has a further part 27 shown in FIG. 2c that is complementary with the part 23, and that has a large generally projecting section 29 that is received in the large generally recessed cavity section 25 when the mould parts are brought together. The article is moulded between section 25 and section 29 of the two mould parts.

Reverting to FIG. 2a, the mould part 23 has a plurality of ports 31a, 31b corresponding in position to the outlets 21a, 21b of the manifold assembly. In the form shown, these ports are positioned adjacent opposite ends of the cavity section 25 of the mould part, so the molten resin is injected into the cavity section 25 from opposite ends.

At least one of, and preferably both of, the mould parts 23, 27 are provided with heating elements or heat exchangers (not shown), so the mould can be heated to a desired temperature. Preferably, the mould is heated to a temperature of at least about 50° C., more preferably between about 50° C. and about 80° C., more preferably between about 50° C. and about 70° C., more preferably between about 55° C. and about 70° C., most preferably about 55° C. or about 70° C. Alternatively, the mould may be heated to a lower temperature.

Additionally, the manifold assembly 17 is provided with heating elements 20 to maintain the molten resin at a desired temperature until it is injected into the mould. Preferably, the molten resin is maintained at substantially the same temperature as that at which it exits the nozzle and enters the sprue bush 15. That is, the molten resin in the manifold assembly preferably has a temperature of at least about 240° C., preferably between about 240° C. and about 265° C., more preferably between about 240° C. and about 255° C., more preferably between about 245° C. and about 255° C., more preferably between about 250° C. and about 255° C., most preferably about 255° C. By maintaining elevated temperature molten resin in the manifold assembly, once one part has been moulded and removed from the mould, the resin for the next part will be able to be injected into the mould very rapidly.

Figure 2C:
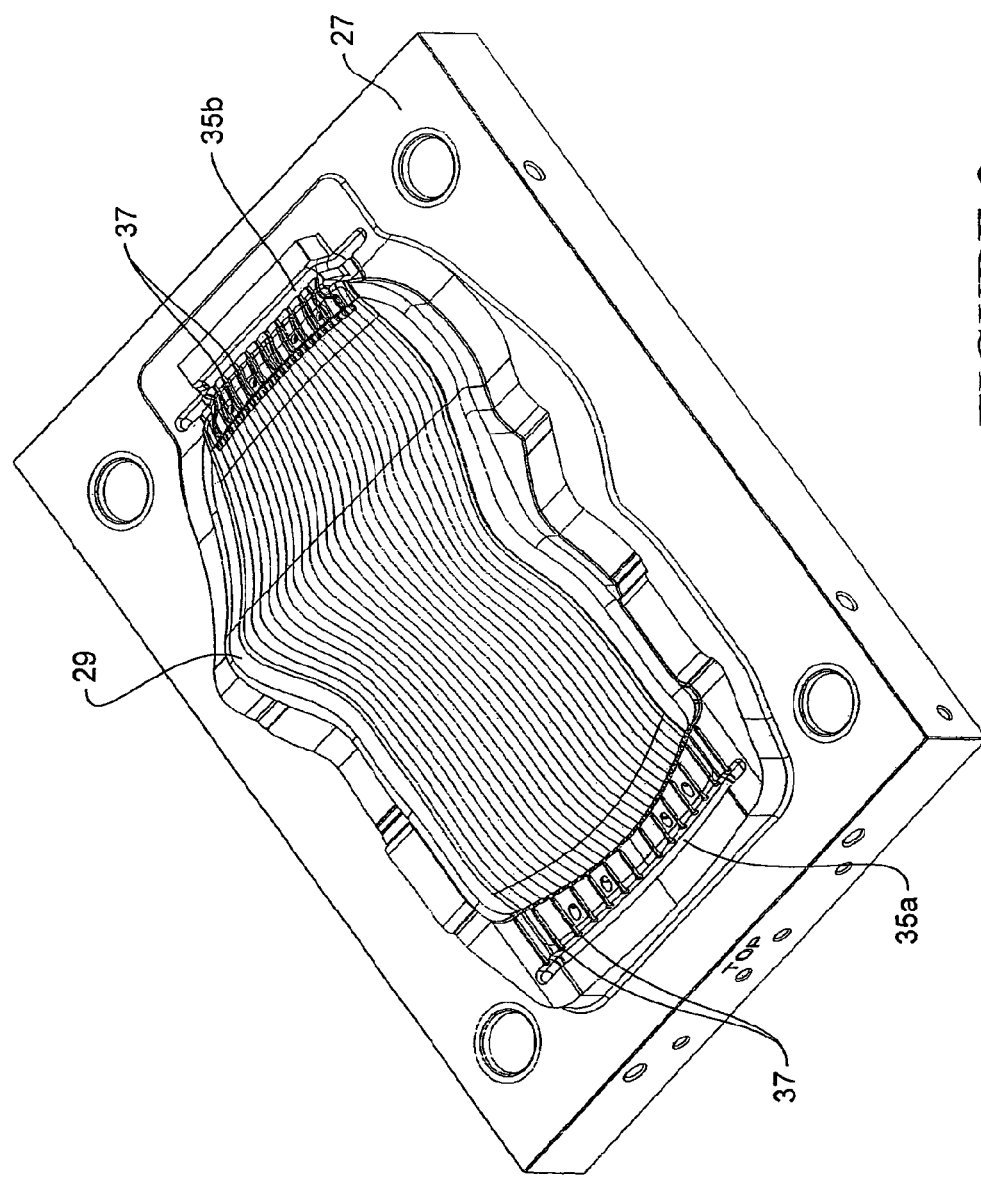

As shown in FIG. 2*c*, two spaced apart transverse channels 35*a*, 35*b* are provided in mould part 27. The channels 35*a*, 35*b* are positioned in opposing relationship with the two sets of ports 31*a*, 31*b* respectively when the mould parts 23, 27 are brought together. The channels form runners 35*a*, 35*b* between the two mould parts 23, 27. The molten resin that is injected into the closed mould through the ports 31*a*, 31*b* will pass along transverse channels or runners 35*a*, 35*b*.

A plurality of further channels 37 are in fluid communication with the runners 35*a*, 35*b*, and extend inwardly toward the centre of the mould part and generally perpendicularly from the runners 35*a*, 35*b*. These further channels 37 form gates that enter the part of the mould cavity where the moulded article is formed.

Figure 2D:
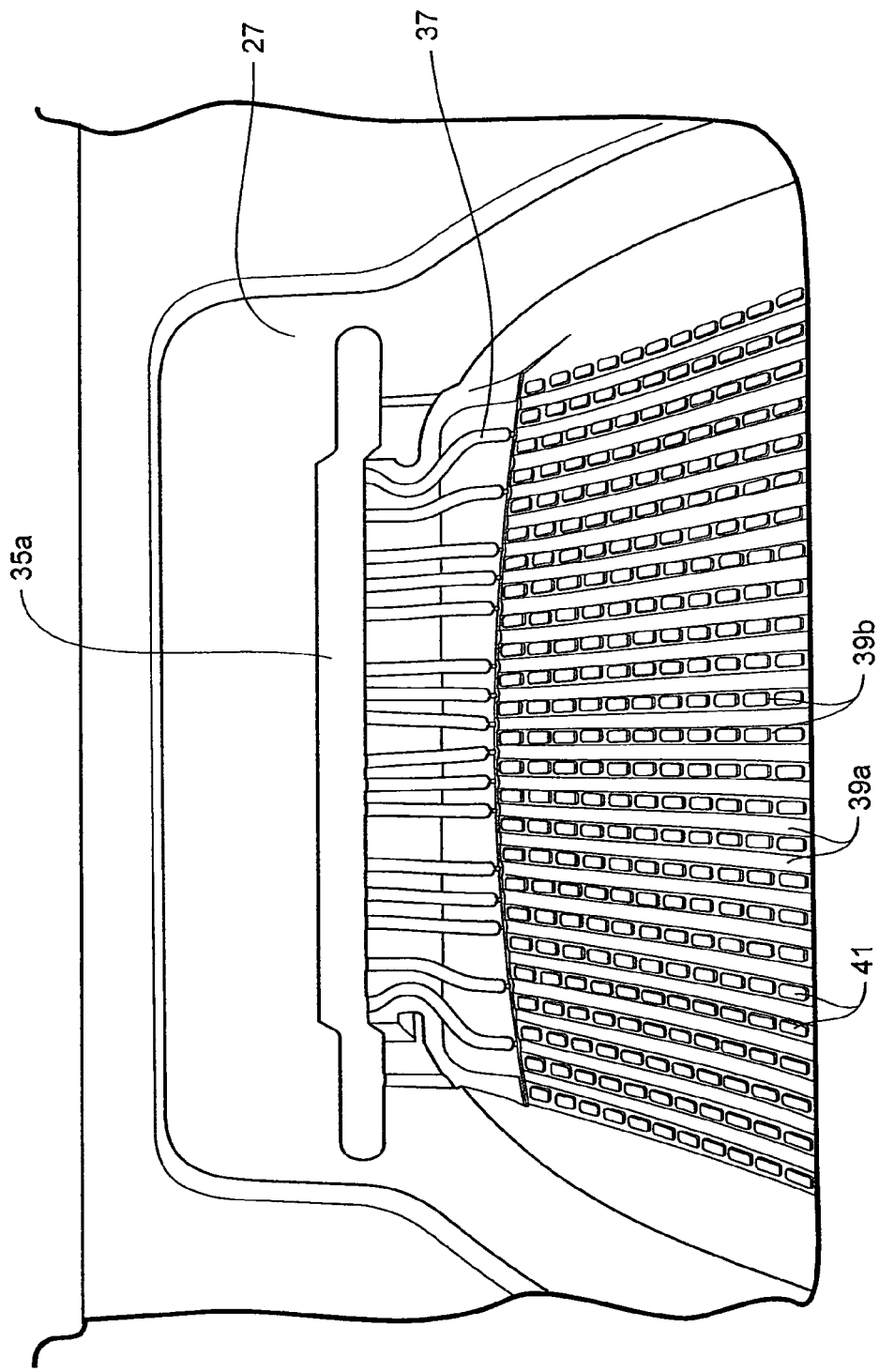
FIG. 2d is a detail view of a section of the mould tool part of FIG. 2c, showing the projections in the tool cavity that provide apertures in the moulded article.

Referring to FIG. 2*d*, the mould cavity where the article is formed has a plurality of channels or cavities 39*a*, 39*b* separated by protrusions or cores 41. Corresponding channels and protrusions will preferably be provided in part 23, although that is not essential. Inside each cavity, the molten resin flows around the protrusions 41 and conforms to the cavity geometry to form the moulded article. The protrusions preferably have radii at their corners rather than sharp corners. By providing complementary protrusions in each mould part, the article can be formed with apertures between its members, which apertures have radii at the intersections of the polymeric members. The radii can be seen in FIGS. 14 and 15 for example. The article is thereby formed as a sheet mesh. The sheet mesh article has a length and a width substantially greater than its depth. The apertures may be any suitable size, shape, and configuration. The members and apertures form cross-sectional features in the article. The apertures are preferably sized sufficiently small to minimise or prevent the catching of buttons on a user's clothing.

While the mould is shown in a configuration in which the entire article is formed as a mesh sheet, the mould could additionally be configured to form other features in the moulded article so that only part of the article is a sheet. By way of example only, enlarged recesses may be provided around at least parts of the mould, so that the article is provided with enlarged heads around at least part of the periphery of the sheet part of the article, with the moulded heads being used to connect the formed article to a support in use. It is preferred that at least a major part of the article is a sheet.

The preferred form method comprises injecting the polymeric resin into the mould parts to form an article, at least part of which is a sheet with a plurality of members that are integrally formed into the sheet part, with apertures provided between at least some of the members of the sheet part of the article to form a mesh, wherein at least the sheet part of the article is suitable for strain orientation. Preferably, the apertures are provided between at least a majority of the members. Preferably, the apertures are provided between all of the members. The method comprises providing the polymeric resin 5, heating the resin to form a molten resin at a temperature of at least about 240° C. as it passes along the chamber 9, injecting the molten resin into the mould 23, 27 to substantially fill the mould and form an article, at least part of which is a sheet with a plurality of members that are integrally formed into the sheet part, with apertures provided between at least a majority of the members of the sheet part of the article to form a mesh, and removing the formed article from the mould, wherein at least the sheet part of the article is suitable for strain orientation.

The molten resin temperature of at least about 240° C., preferably between about 240° C. and about 265° C., more preferably between about 240° C. and about 255° C., more preferably between about 245° C. and about 255° C., more preferably between about 250° C. and about 255° C., most preferably about 255° C., enables the resin to be injected into the mould with a high speed or velocity, in a short period of time. Preferably the molten resin has a velocity of at least about 1000 mm/second where it exits the or each gate and enters the mould cavity where the article is form, preferably between about 1000 mm/second and about 2000 mm/second, preferably between about 1500 mm/second and about 2000 mm/second. Preferably, the velocities are within the mentioned ranges, irrespective of the article size.

Preferably, the mould is filled using an injection time of about 2.0 seconds or less, more preferably between about 1.0 seconds and about 2.0 seconds, most preferably of about 1.0, 1.1, about 1.2, about 1.3, about 1.4, about 1.5, about 1.6, about 1.7, about 1.8, about 1.9, or about 2.0 seconds. For an article containing about 58 cm$^3$ of resin for example, the flow rate of resin in the mould is preferably an average of at least about 29 cm$^3$/second, more preferably between about 29 cm$^3$/second and about 58 cm$^3$/second, most preferably of about 58 cm$^3$/second, 52.7 cm$^3$/second, about 48.3 cm$^3$/second, about 44.6 cm$^3$/second, about 41.4 cm$^3$/second, about 38.7 cm$^3$/second, about 36.3 cm$^3$/second, about 34.1 cm$^3$/second, about 32.2 cm$^3$/second, about 30.5 cm$^3$/second, or about 29 cm$^3$/second. For a larger article, the flow rate may be within the same range (meaning the mould takes longer to fill), or alternatively may be faster so the mould may be filled in substantially the same time. For example, for an article containing about 573.2 cm$^3$ of resin, to achieve the same injection time, the flow rate of material may be an average of at least about 286.6 cm$^3$/second, more preferably between about 286.6 cm$^3$/second and about 573.2 cm$^3$/second, most preferably of about 573.2 cm$^3$/second, about 521.1 cm$^3$/second, about 477.7 cm$^3$/second, about 440.9 cm$^3$/second, about 409.4 cm$^3$/second, about 382.1 cm$^3$/second, about 358.3 cm$^3$/second, about 337.2 cm$^3$/second, about 318.4 cm$^3$/second, about 301.7 cm$^3$/second, or about 286.6 cm$^3$/second. For a smaller article, the flow rate may be within the same range (meaning the mould takes a shorter time to fill), or alternatively may be slower so the mould may be filled in substantially the same time.

Preferably, the molten resin is injected at an injection pressure of at least about 80 MPa to substantially fill the mould. Preferably, the injection pressure is at least about 100 MPa, preferably at least about 120 MPa. The injection pressure may be between about 80 MPa and about 135 MPa, preferably between about 80 MPa and about 132 MPa. For a smaller part, the injection pressure may be between about 80 MPa and about 100 MPa, and for a larger part the injection pressure may be between about 100 MPa and about 132 MPa, preferably between about 120 MPa and about 132 MPa.

Once the mould has been filled with molten resin, the resin is allowed to at least partly cure in the mould. The resin may be held in the mould at a relatively low hold pressure to at least partly cure, such as less than about 22 MPa for example, preferably between about 5.5 and about 22 MPa. Alternatively, the resin may be held at a higher pressure.

In the preferred embodiment, the pressure applied to the resin is transitioned from the higher injection pressure to the lower hold pressure. Preferably, the transition comprises a plurality of pressures that step down from the injection pressure to the hold pressure. The pressures will be selected dependent on process parameters, such as rate of fill, and gate type and sizes for example.

The final table under "Experimental Results" before the claim set shows the results for a trial using a fully electric injection moulding machine. The part size was the same as for the second table. When a hydraulic injection moulding machine is used, and the pressure is dropped from the injection pressure to the hold pressure, that pressure decays or transitions over a period of time, rather than instantaneously. However, initial tests with the fully electric injection moulding machine in which the pressure dropped instantaneously from the injection pressure to the hold pressure, did not provide usable parts. By operating the fully electric machine to transition or decay the pressure in a controlled manner over time, usable parts were obtained. The results in the third table show the parameters of a successful trial.

It is believed that controlled transitioning of the pressure from the injection pressure to the hold pressure acts as a shock absorber, helping to prevent injection screw recoil that would otherwise occur as the pressurised molten resin in the cavity overcomes the hold pressure behind the injection screw. If the pressure is dropped instantaneously from the injection pressure to the hold pressure, the screw recoil may be sufficient to draw resin back from the part and into the barrel through the gates, and the screw may then return under the hold pressure causing resin to move into the mould through the gates.

In the preferred embodiment process, once the injection pressure has been used to fill the cavity in the mould with molten resin, there is a transition in pressures between the higher injection pressure and the lower hold pressure when the resin is curing, to at least minimise and preferably to prevent any recoiling of the injection screw. That transition overcomes the natural tendency of the injection screw to recoil as the injection pressure rapidly drops below that of the pressure of the molten resin in the cavity. The transition pressures are profiled in such a way as to minimise movement of resin through the gates, either into or out of the mould through the gates during the curing process. However, the hold pressure will generally be sufficient to provide inward flow of only a sufficient amount of resin into the cavity to compensate for shrinkage or sinking of the article during curing. The transition period is preferably as short as possible to prevent or minimise screw recoil without unduly adding molten resin to or removing molten resin from the cavity.

The article may be fully cured within the mould. Alternatively, the article may be cured a sufficient amount in the mould to allow it to substantially hold its shape, but may be fully cured externally of the mould.

When the mould is closed, sufficient air gaps or vents are provided to enable the mould to vent as the resin is injected. That enables the resin to be injected into the mould at a high velocity. The vents will generally be provided where the flowing resin meets the end of the mould tool, or meets resin flowing from a different direction. The vents may be provided through the mould, for example thorough the projections in the mould cavity for example.

Preferably, at least part of the sheet part of the formed article is capable of being stretched to at least about 500%, preferably at least about 600%, more preferably at least about 700%, more preferably at least about 800%, most preferably at least about 900%, of an initial dimension without failure, such that strain orientation occurs. The large amount of stretching provides greater strain orientation than a small amount of stretching would. For example, at least some of the members that are elongate in the direction of stretching may be capable of being stretched such that their length is at least about 500% of their original length.

To remove the partly or fully cured formed article from the mould, the mould is opened, and the article is removed from the mould.

In use, pressure is applied to the mould by hydraulic rams or similar. This holds the mould closed during injection, and while the article is at least partly curing in the mould. The apparatus will be provided with other standard equipment that enables the preferred form method to be carried out.

The injection pressure, time, and velocity may depend on the size of the article to be made. For example, an injection pressure of about 120 MPa may be suitable for manufacturing a membrane that forms a cover for a back portion or seat portion of a chair. To make a smaller article, the pressure and velocity may be reduced and the same mould fill time used. Alternatively, the pressure and velocity may remain the same, but a shorter fill time achieved. Similarly, for a larger article, the pressure and velocity may be increased and the same fill time used, or the pressure and velocity may remain the same, but a longer fill time achieved.

The sheet part of the formed article may have one or more profile features formed as part of the moulding process. By way of example only, at least part of the article may have a curved side profile and/or a curved top profile that is formed as part of the moulding process. FIGS. 2a and 2c show curved regions in the mould part cavities, that form profile features in the moulded article. When the moulded article is removed from the mould, it will maintain those profile features. By moulding the article, it can readily be formed with a three dimensional profile. As an alternative, the sheet part of the article may be substantially flat. The non-sheet part of the article, if present, may or may not have one or more profile features.

The mould parts 23, 27 will be formed from any suitable material, such as hardened steel, pre-hardened steel, aluminium, or beryllium-copper alloy for example.

The formed article may be a support surface for a chair. For example, the formed article may be a back membrane or seat membrane for a chair that is subsequently mounted to a frame to support the membrane. Preferably, the seat or back frame comprises an opening that is at least partly bounded by frame members, and the method comprises supporting the formed article from the frame with part of the formed article extending across the opening, to form a compliant suspended support surface.

However, the method may be used to form any other suitable type of article. By way of example only, the method could be used to form other articles that have application as or in: resistance members in exercise equipment; contact sport helmets; helmet and hat liners; harnesses for backpacks, climbing, safety, paraponting, bungee jumping; support surfaces for baby products including car seats, bouncy beds, baby buggies, cots; trampolines such as springs, mats, minitramps, fire trampolines; other furniture such as dental chairs, aeroplane seating, stadium seating, outdoor furniture; bedding, such as mattress replacements, mattress support surfaces, or pillows; automotive seating, soft tailgates, canopies; hammocks; wake board, snow board, and/or ski bindings; bicycle seats; luggage stowage in transport; hitting surfaces of racquets for sports such as tennis, squash, badminton; wetsuits such as flexible inserts; yachting, such as a catamaran trampoline surface.

The article may be moulded generally in the desired final shape, with at least part of the article being in sheet form. At least part of the sheet part of the article will be strain oriented following moulding and prior to use. Alternatively, the article may be moulded in a generally flat shape, and at least part of the sheet part of the article then strain oriented, and the article formed into a final shape by a post-forming process such as sewing or adhering for example.

Chair Application for Moulded Article

The following describes, with reference to FIGS. 4 to 19, one suitable application for an article made by the preferred form method described above. The chair is generally of the type described in our PCT application number PCT/NZ2007/000289 (published as WO 2008/041868), the contents of which are incorporated herein in their entirety by way of reference. The full details of the chair are not repeated here.

Since the figures illustrate the preferred form chair from various different angles as convenient to explain certain parts, an arrow marked "F" has been inserted into the figures where appropriate to indicate a forward direction of the chair. Accordingly the terms forward, rearward, left side, and right side (or similar) should be construed with reference to the forward direction F of the chair, not necessarily with reference to the orientation shown in the particular figure.

Figure 4:
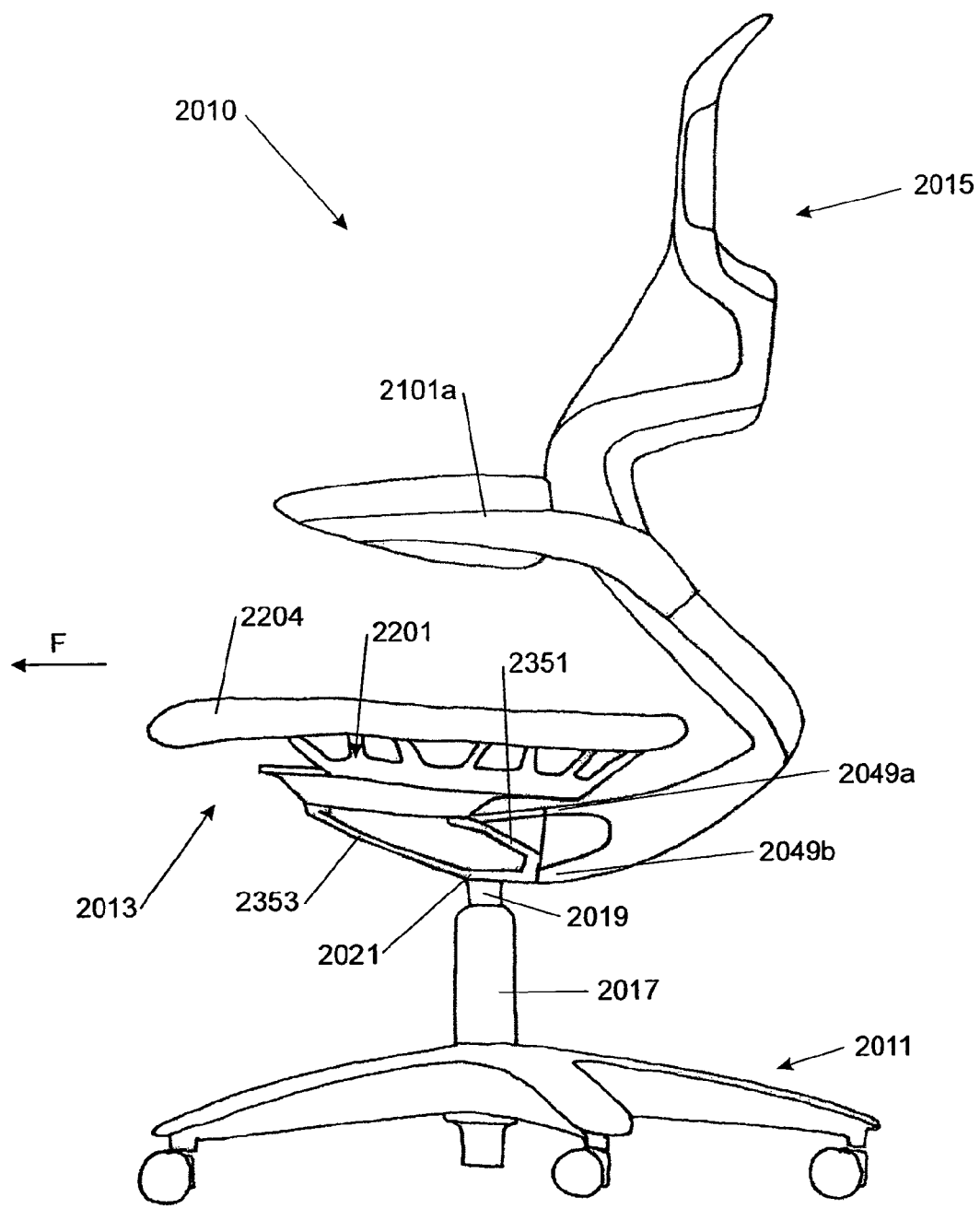
FIG. 4 is a side elevation view of a preferred form chair which may incorporate a moulded article made by the method of the present invention.
Figure 5:
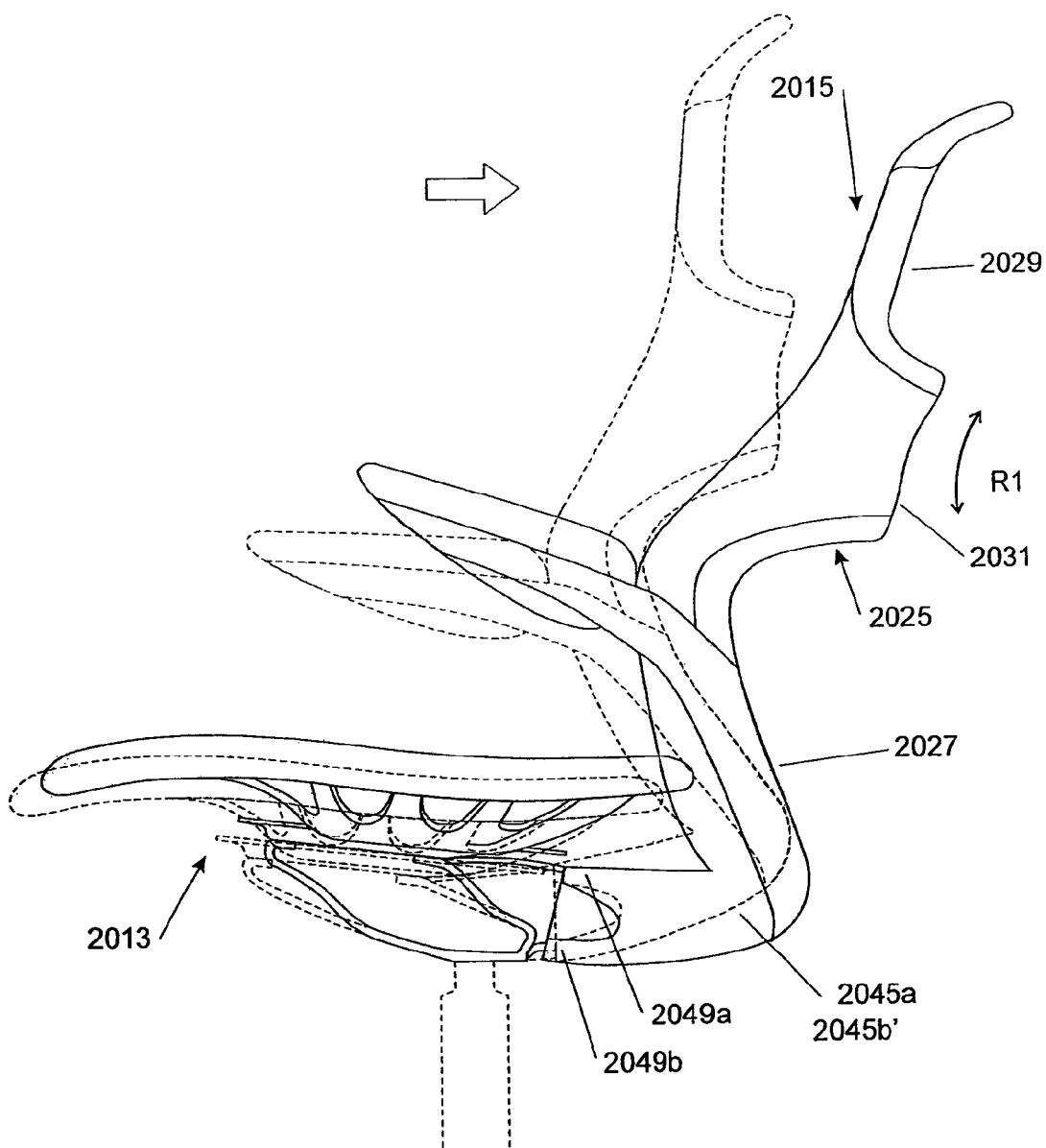
FIG. 5 is a side elevation view showing a reclining action of the preferred form back portion of the chair of FIG. 4.
Figure 6:
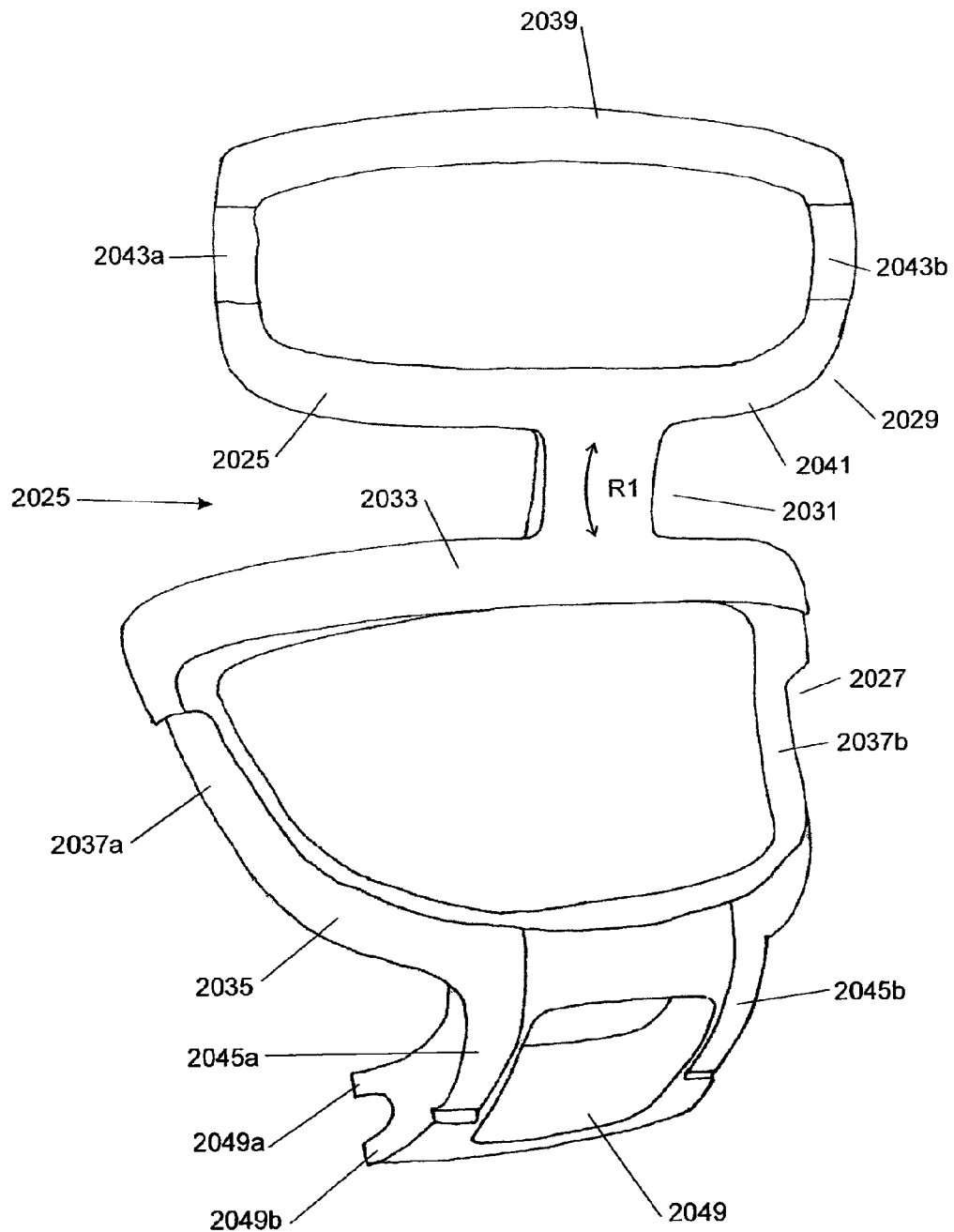
FIG. 6 is a rear perspective view of the preferred form back portion of the chair of FIG. 4, showing regions of flexibility.
Figure 7:
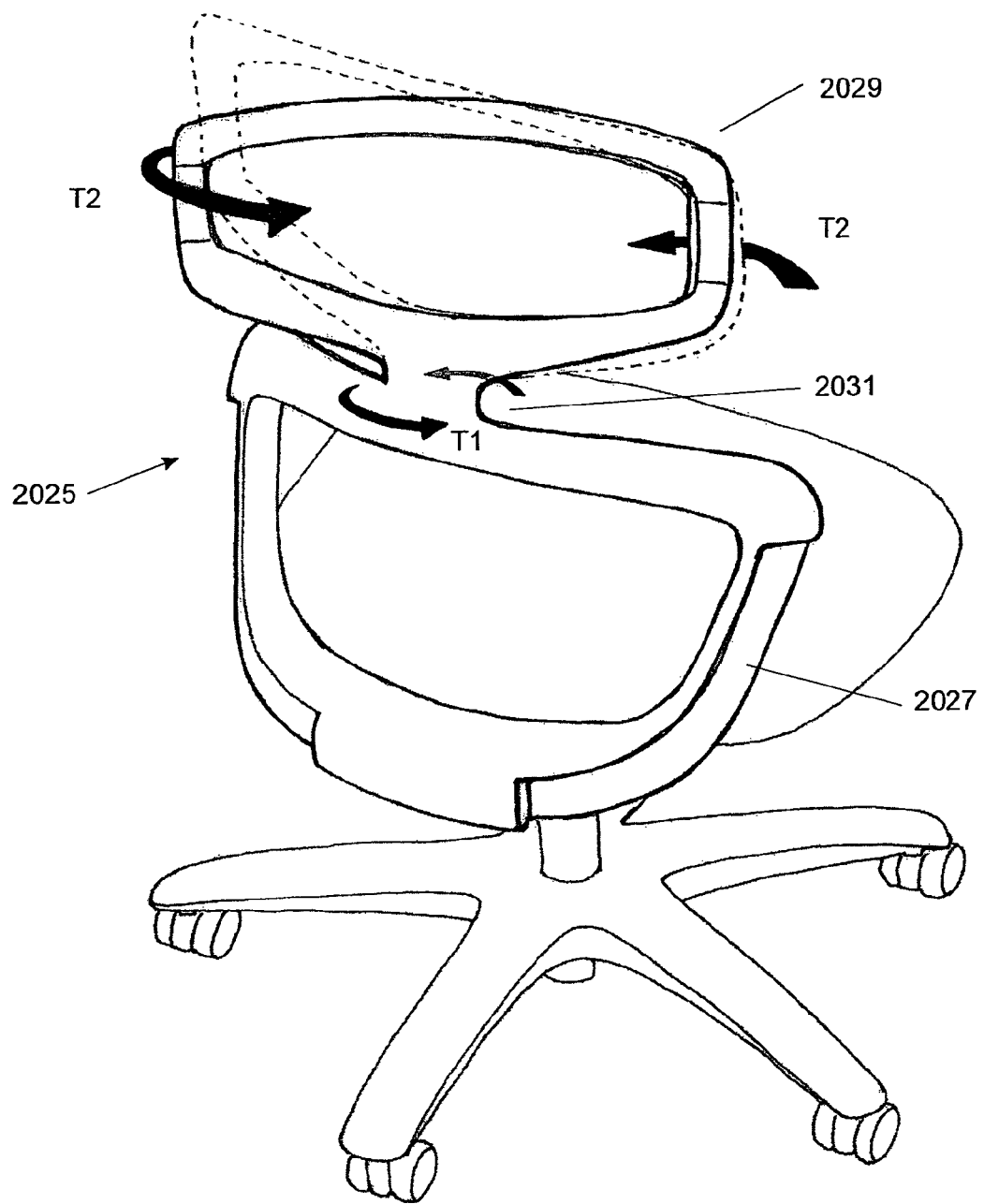
FIG. 7 is a view similar to FIG. 6, showing the twisting actions of the upper portion of the back portion.

FIG. 4 illustrates an office task chair including a main assembly having a seat portion 2013 and a back portion 2015. The seat portion 2013 and the back portion 2015 are operatively supported above the ground by a supporting frame including a wheeled or castored base 2011 having a central support column 2017 housing a height adjust spring 2019 for selective height adjustment of the main assembly. The base 2011, support column 2017, and spring 2019 form a height adjust pedestal. An upper end of the height adjust spring is connected to the main transom 2021 of the chair. The castored base 2011, height adjust spring 2019, and main transom all form part of the supporting frame. In this embodiment, the castored base 2011 is a standard configuration with a separate post 2017 mounted to the base 2011.

As can be seen from FIGS. 5 to 8, the lower portion 2027 of the back portion has a transversely extending top member 2033, a transversely extending bottom member 2035, and at least two spaced apart members 2037a, 2037b interconnecting the top and bottom members. The members 2037a, 2037b effectively form a continuation of the transversely extending bottom member 2035, and are angled forwardly, outwardly, and upwardly from the bottom member. At least part of each of the members 2037a, 2037b may be generally linear as shown. In the form shown, the members 2037a, 2037b are each positioned at a respective end of the top and bottom transverse members.

The top 2033 and bottom 2035 members are generally concave when viewed from the front of the seat. The top member 2033 and the spaced apart members 2037a, 2037b extend around the sides of the lower back of a seated adult occupant, so that the lower portion of the back frame "cups" the lower back of the seated occupant.

The back portion comprises at least one support member extending from the lower portion 2027, to provide a means of supporting the back portion from another part of the chair, such as the main transom of the supporting frame, the seat portion, or from both the seat portion and supporting frame. In the form shown, the back portion has two horizontally spaced support members 2045a, 2045b. The support members 2045a, 2045b are connected to the lower portion 2027 of the back portion, at or adjacent a bottom edge of the lower portion of the back frame. In the form shown, the support members 2045a, 2045b are connected to the bottom transverse member 2035 of the lower portion of the back frame.

The support members 2045a, 2045b are of a substantially rigid construction.

In the form shown, the horizontally spaced support members 2045a, 2045b are adjoined at lower ends thereof by an integral transverse connector member 2049. The transverse connector member incorporates upper and lower connectors 2049a, 2049b that extend in a generally forwardly-directed V-shaped configuration.

The back frame and support members are of a unitary construction, and may be moulded from a polymeric material for example.

It is preferred that the lower portion of the back frame is substantially unable to twist about an axis extending substantially parallel to and between the members 2045a, 2045b.

At least a lower part of the upper portion and at least an upper part of the lower portion are preferably resiliently flexible.

Figure 8:
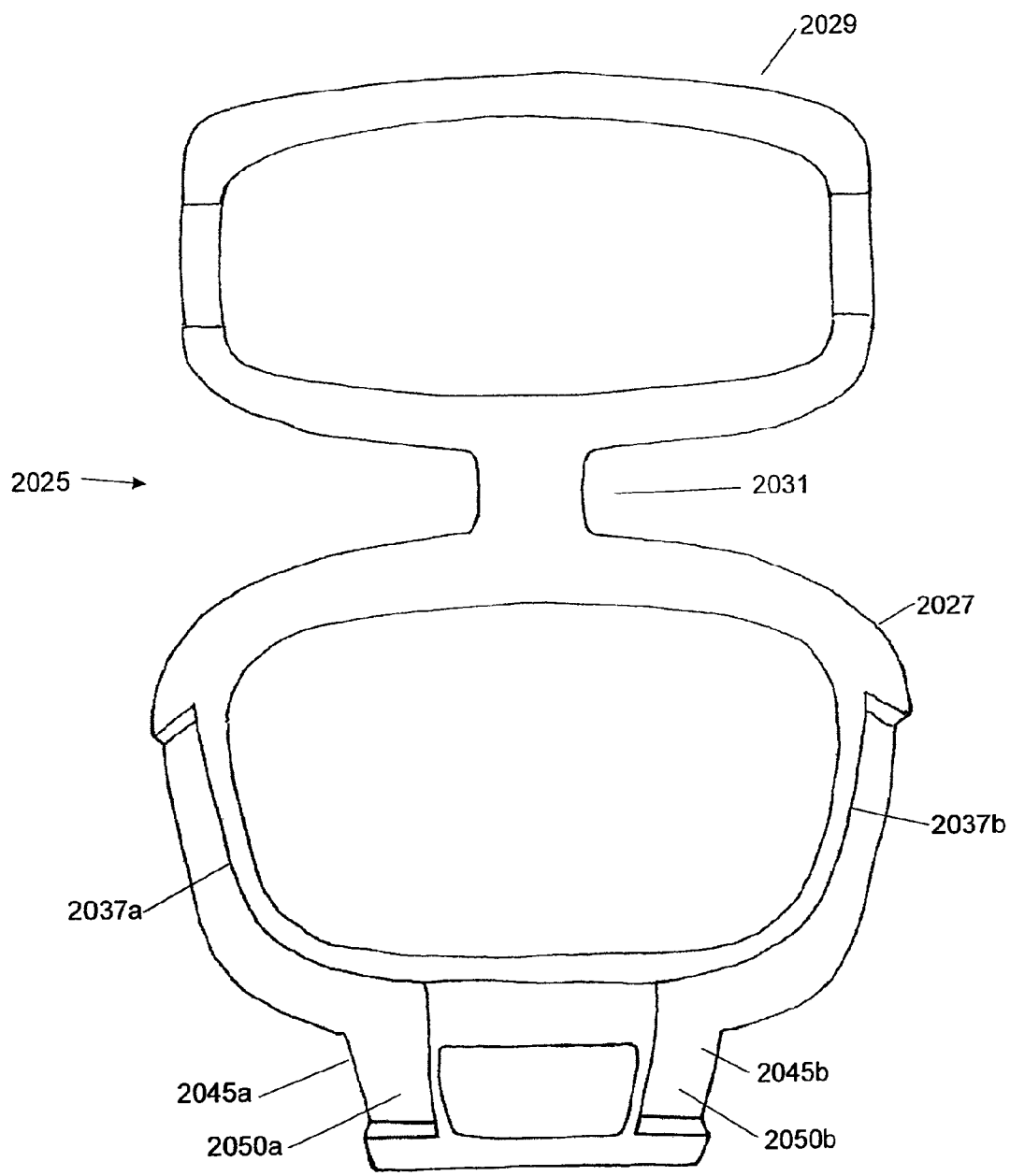
FIG. 8 is a rear view of the back frame.

As shown in FIG. 8, the lower portion of the back frame incorporates arm rest support mounts 2050a, 2050b, for receiving arm rest supports in the form of posts that support arm rests in a cantilevered manner.

Referring to FIGS. 12a to 19, a resiliently flexible cover which is formed by the preferred form moulding method described above is pulled taut and operatively connected to the back frame to provide a supporting surface for the back of the seated occupant. In this form, the cover is moulded with the longitudinally extending elongate members 2063a that differ from the transversely extending elongate members 2063b, and that are provided with apertures to form a mesh sheet part of the article. In the form shown, the longitudinally extending members 2063a are thicker in the transverse direction of the cover than the transversely extending members 2063b are in the longitudinal direction of the cover.

As discussed above, the injection moulding apparatus has ports 31a, 31b adjacent opposite ends of a mould cavity so that molten resin is injected into the cavity from opposite ends, and the generally longitudinally extending elongate members are substantially aligned with the direction that extends between the ends of the mould cavity. That is, the thicker longitudinally extending members are oriented with the predominant flow direction of molten resin in the mould.

Due to the relatively thick longitudinal members, when the cover is expanded transversely, the horizontal members will elongate a greater amount than the width elongation of the longitudinal members. That is, the transverse strands between the longitudinal members will elongate a greater amount than the width elongation of the longitudinal members. Therefore, greater strain orientation of those transverse strands occurs. The cover may be formed from any suitable material, but is preferably an elastomeric material such as HYTREL. In the most preferred embodiment, the cover is formed from HYTREL 4069. Other materials, such as any of those listed above, could be used.

In the completed article, the thicker longitudinally extending members substantially extend between upper and lower transverse back frame members (or between front and rear seat frame members in the case of a seat), and the thinner transverse members substantially extend between side frame members. The end result in at least preferred embodiments is a compliant suspended support surface that is pliable, and has good creep resistance and tensile strength.

At least some of the generally longitudinally extending elongate members 2063a may have a greater depth (in a direction through the page in FIG. 12a) than at least some of the generally transversely extending elongate members 2063b. For example, a generally centrally disposed plurality of the generally longitudinally extending elongate members may have a greater depth than the generally transversely extending elongate members. The generally centrally disposed plurality of the generally longitudinally extending elongate members may have a greater depth than the remaining generally longitudinally extending elongate members. Other configurations could be provided. Alternatively or in addition, at least some of the generally longitudinally extending elongate members may project further forward in a body supporting direction than at least some of the generally transversely extending elongate members.

Preferably, in the as-moulded formed article, at least some of the elongate members have a cross-sectional dimension of about 10 mm or less, more preferably of about 5 mm or less, more preferably of about 2.5 mm or less. Preferably, in the as-moulded formed article, at least a majority of the elongate members have a cross-sectional dimension of about 10 mm or less, more preferably of about 5 mm or less, more preferably of about 2.5 mm or less. Preferably, at least some of the elongate members have a cross-sectional dimension of about 2 mm.

Preferably, where the elongate members have more than one cross-sectional dimension, for at least some of the elongate members all cross-sectional dimensions of each member are about 10 mm or less, more preferably about 5 mm or less, more preferably about 2.5 mm or less.

In the preferred embodiment article, the thickness of the sheet part is about 2.5 mm, the generally transversely extending members have a cross-sectional width (in the longitudinal direction) of about 2 mm, and the generally longitudinally extending members have a cross sectional width (in the transverse direction) of about 10 mm or less.

If the article is to be used as seat surface rather than a back surface, the thickness of the sheet part may be greater than mentioned above; for example about twice the thickness mentioned above. Alternatively or additionally, the widths of the elongate members could be greater than mentioned above; for example about twice the widths mentioned above. For other applications, the members of the mesh could have significantly different cross-sectional dimensions from those mentioned above. For example, for higher load capacities, the members could have larger cross-sections.

Preferably, the stretched dimension SW is between about 1.4 and about 2.9 times the as-moulded dimension IW, and preferably about 2.15 times the as-moulded dimension. Each strand (between adjacent longitudinal members) of the elongate members oriented in the stretching direction is preferably stretched to between about 3 and about 10 times, preferably to between about 3 and about 9 times, preferably to between about 3 and about 8 times, preferably to between about 5 and about 10 times, preferably to between about 5 and about 9 times, preferably to between about 5 and about 8 times its as-moulded length.

Preferably, the post-stretching relaxation dimension RW of the cover is between about 1.1 and about 1.75 times the as-moulded dimension, preferably about 1.2 times the as-moulded dimension. The post-stretching relaxation length of each strand (between adjacent longitudinal members) of the elongate members oriented in the stretching direction is preferably between about 1.5 and about 4.5 times its original length, more preferably about 2.1 times its original length.

In the preferred form shown, the greatest as-moulded width dimension of the cover is 390 mm. That is stretched out to 840 mm, but could be stretched to anywhere between 555 mm and 1130 mm. When stretching the width of the cover from 390 mm to 840 mm, the transverse strands stretch to about 21 mm.

The cover then relaxes to 475 mm width, but that could vary between 450 mm and 680 mm. The post-stretching relaxation length of the transverse strands is 7 mm in comparison to a 3.33 mm starting length. That could vary between 5 mm and 15 mm.

The cover is then stretched prior to connection to the frame. The corresponding frame dimension is 510 mm, meaning the cover is stretched to about 1.4 times its as-moulded width.

Although not clear from the figures, following strain orientation the transverse members will be longer than prior to strain orientation, and will have a smaller cross-section. That is, the stretched length SL will be greater than the initial length IL, and the cross-section will be smaller than an initial cross-section. The post-stretching relaxation length RL will be smaller than the stretched length SL, but greater than the initial length. The post-stretching relaxation cross-section will be between the initial cross-section and the stretched cross-section.

Prior to and following strain orientation, the transverse members in the mesh sheet part of the article preferably each have substantially the same length. That enables an even amount of strain orientation to occur for each member. However, in some embodiments, it may be desirable to have varying lengths, so some members are strain oriented differing amounts to obtain varying properties across the seat. The pitch of the members may vary in different parts of the mesh sheet part of the article.

The cover preferably has a surface texture inmoulded as part of the moulding process.

The cover is preferably provided with attachment features that are integrally formed as part of the moulding process, and that are used to attach the cover to the frame. The mould will be provided with suitable features in the cavity to form the attachment features. The cover could be relaxed onto the frame after expanding the cover to strain orientate at least part of the cover, or could be attached to the frame following relaxing of the cover, such as by expanding the cover a small amount as mentioned above.

Figure 14:
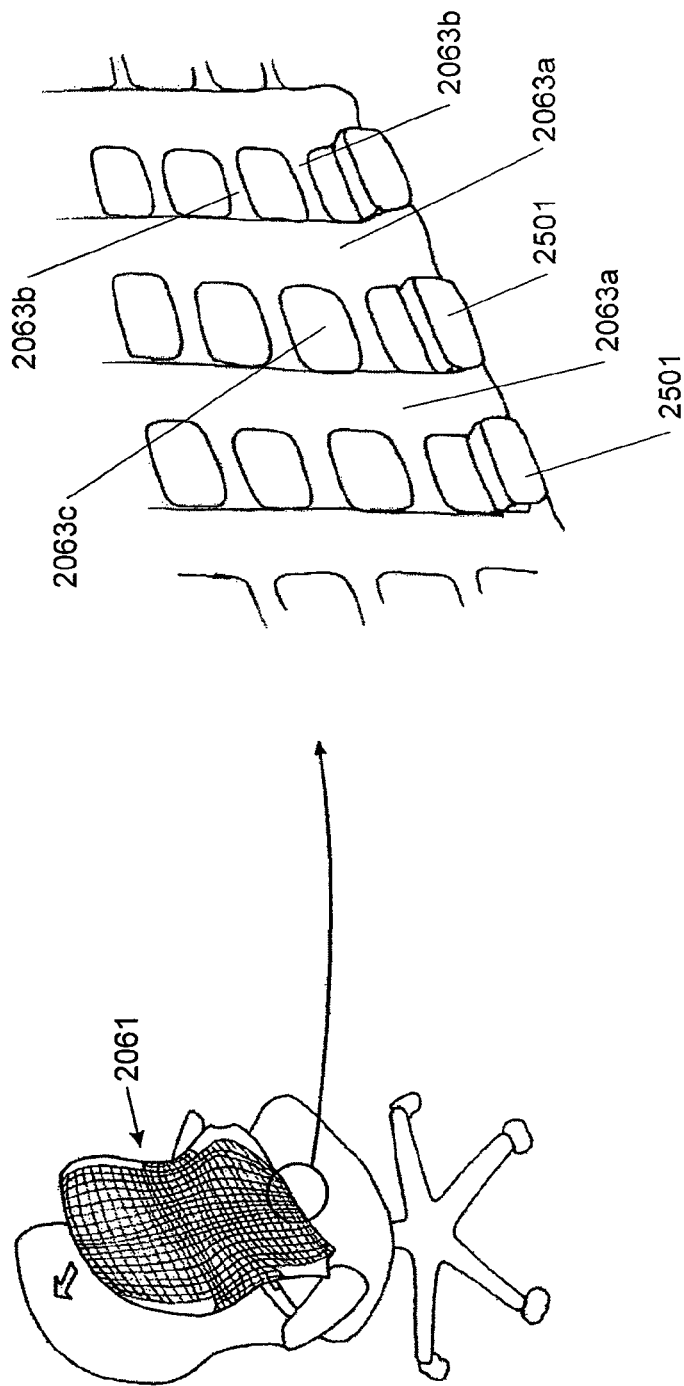
FIG. 14 is a view of a preferred form mounting arrangement of the lower end of the cover/skin to the back portion of the chair of FIG. 4.

FIG. 14 shows a preferred attachment of the lower portion of the cover to the lower portion of the back frame. The lower portion of the back frame is provided with a plurality of hooks 2501 that are integrally moulded as part of the frame. In the preferred form, the hooks are spaced apart across the front face of the bottom transverse frame member 2035, and will be positioned behind the seat portion in use. The hooks 2501 define recesses that extend upwardly from the underside of the hooks.

The cover is provided with a plurality of apertures 2063c that are provided between adjacent pairs of longitudinal elongate members 2063a and adjacent pairs of transverse elongate members 2063b. The lower portion of the cover can be mounted to the lower portion of the back frame by inserting the hooks 2501 through the apertures 2063c in the cover, such that a lowest transverse elongate member 2063b is received in the recesses of the hooks.

Figure 15:
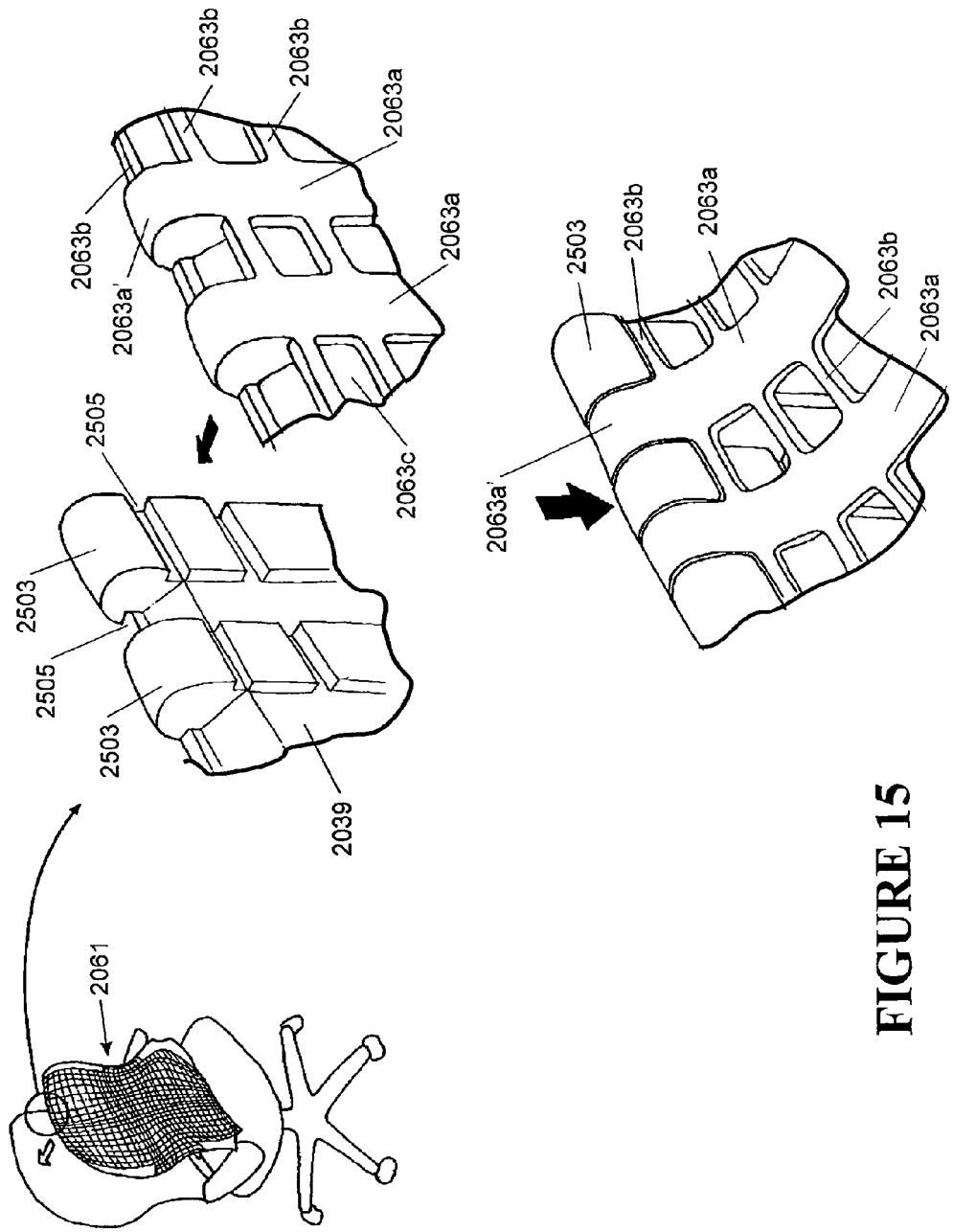
FIG. 15 is a view of a preferred form mounting arrangement of the upper end of the cover/skin to the back portion of the chair of FIG. 4.

FIG. 15 shows a preferred attachment of the upper portion of the cover to the upper portion of the back frame. The upper portion of the back frame is provided with a plurality of heads 2503 that are integrally moulded as part of the frame. In the preferred form, the heads are provided along the top edge of the back frame member 2039. The heads 2503 define recesses 2505 that extend under the front and rear of the hook.

The top edge of the cover is moulded to provide an upper curved head 2603a' at the top of each longitudinally extending member 2063a. The heads have a transversely extending member 2063b extending across the heads in front of and behind the heads. Those transversely extending members are complementary to the recesses 2505 in the frame, and the shape and configuration of the heads 2063a' on the cover correspond substantially to the shape and configuration of the heads 2503 on the frame.

To mount the upper portion of the cover to the upper portion of the frame, the rear transverse member 2063b will be positioned in the recesses 2505 behind the heads 2503, and the cover will then be pulled over the top of the frame so that the cover heads 2063a' are received between the frame heads, and the front transverse member 2063b is positioned in the recesses in front of the heads.

Figure 16:
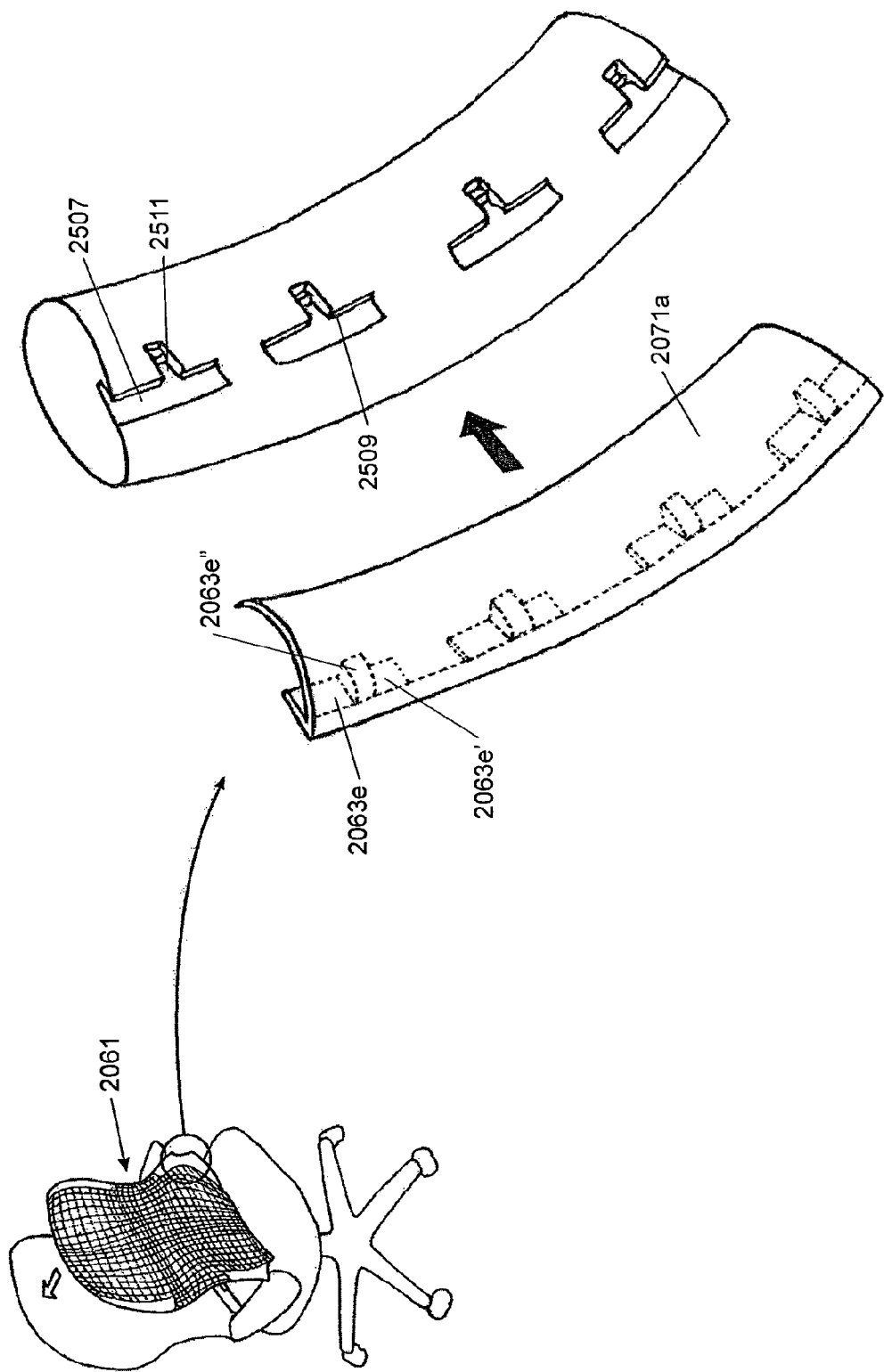
FIG. 16 is a view of a preferred form mounting arrangement of the sides of the cover/skin to the back portion of the chair of FIG. 4.

FIG. 16 shows a preferred attachment of the side portions of the cover to the side members of the back frame. The side portions of the back frame are provided with spaced apart slots 2507 extending into the frame. The slots define generally T-shaped openings with a transverse opening portion 2509 and a generally centrally disposed opening portion 2511.

As can be seen in FIGS. 12a-12c and 16, the sides of the cover comprise solid regions 2069a, 2069b, 2071a, 2071b. In the regions corresponding to the side frame members, the sides of the cover are provided with attachment features 2063e. The attachment features each have a generally planar portion 2063e' that reverses back toward the remainder of the cover from the edge of portion 2063d, and a web 2063e" that connects the generally planar portion 2063e' to the remainder portion 2063d. The web minimises flexing of the planar portion and provides additional strength to the attachment feature. The substantially planar portion 2063e' is sized and configured to fit into the transverse opening portion 2509 in the frame, and the web extends through the opening portion 2511.

The recesses in the frame will generally be provided in a rear surface of the frame, such that the cover extends around the edge of the frame (the right side of the frame member shown in FIG. 16 and back across the opposite side of the frame member from the recesses (the rear side of the frame shown in FIG. 16) and across the opening between the side frame members (to the left side of the frame shown in FIG. 16).

During the stretching of the cover, the side sections will generally not be stretched to any great extent, so strain orientation does not occur in the regions of the side attachment features.

To mount the cover to the frame, the cover will be expanded and the sides of the cover will be pulled around the side members of the frame, and the attachment features 2063e inserted in the recesses in the frame to attach the sides of the cover to the frame. The attachment features may primarily serve a locating function. The cover could additionally be secured to the frame by any suitable means, such as adhesive, fasteners, or welding the cover to the frame for example. The top of the cover will then be attached to the top of the frame as described above. The lower portion of the cover will then be mounted to the hooks on the lower portion of the frame.

As can be seen in FIGS. 12a-12c and 19, the cover comprises a recessed section 2073a, 2073b extending into each side of the cover from opposite sides. The recessed sections correspond generally in vertical position to the relatively narrow interconnecting region 2031 of the back frame, to provide a clearance space for the elbows of a seated occupant. The cover is substantially unsupported in the recessed sections, to provide a compliant support surface for an occupant's elbows resting against the recessed sections.

Additionally, in this configuration, there is no rigid back frame element at the periphery of the back assembly at the normal height of a desk or table surface. That minimises the risk of damage to office furniture.

The cover comprises a section 2061a, 2061b that extends rearwardly and inwardly from each recessed section 2073a, 2073b. The sections 2061a, 2061b may connect to the relatively narrow interconnecting region 2031 of the back frame. Alternatively, or in addition, the sections 2061a, 2061b may connect to the frame members 2033, 2041 of the back frame. The configurations of the frame and sections 2061a, 2061b are such that the rear of the back portion has a desirable "bow tie" type aesthetic in that region. The sections 2061a, 2061b that extend rearwardly and inwardly may be an integrally moulded part of the cover, or they may be separate components that are connected to the front part of the cover in that region. They will generally not be strain oriented.

Figure 17A:
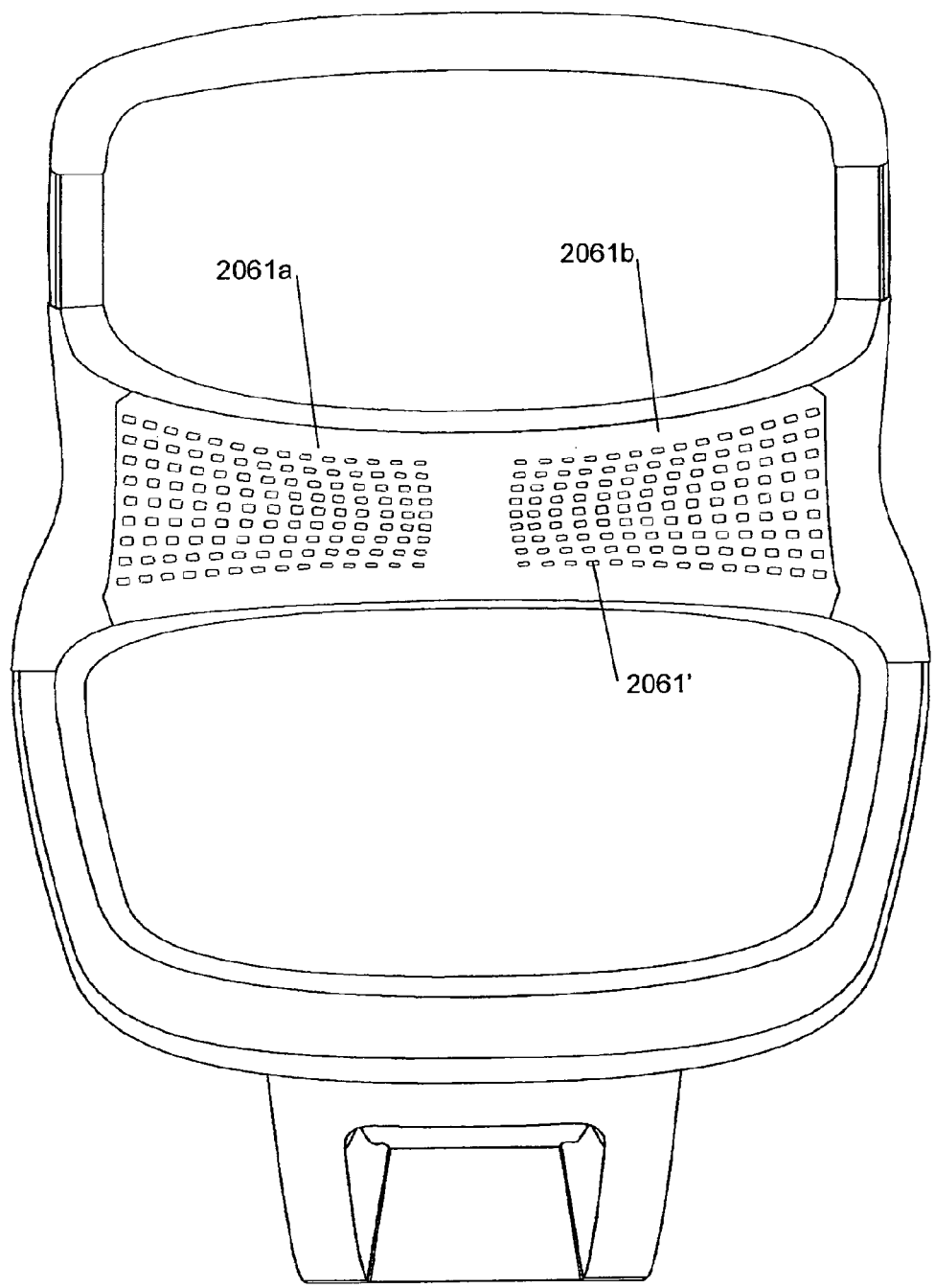
FIG. 17a is a rear view of the back portion of the chair, showing a preferred form of the "bow tie" feature.
Figure 17B:
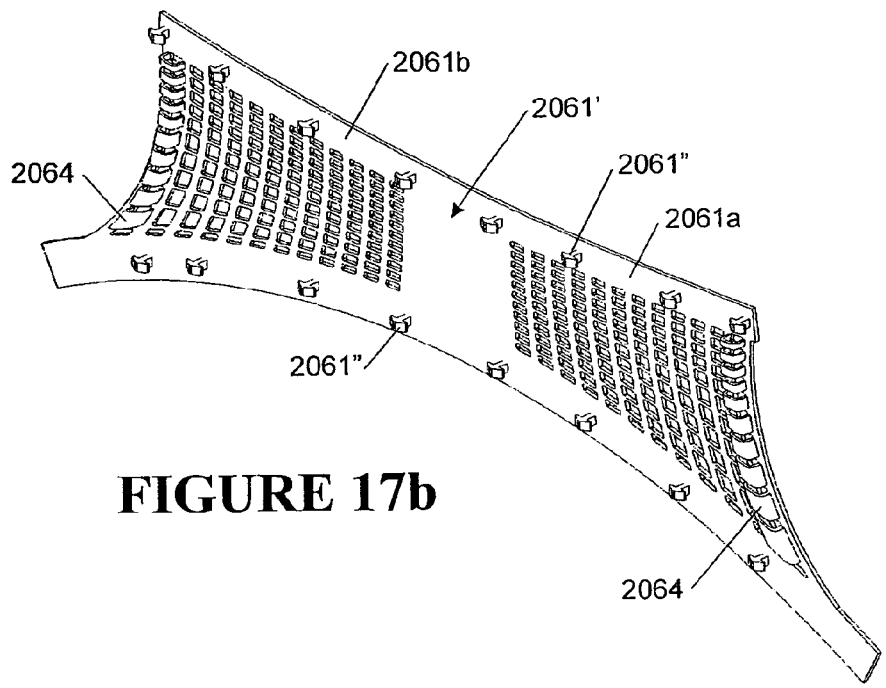
FIG. 17b is a front view of the bow tie feature, showing attachment features.

FIG. 17a shows a preferred form rearward cover section 2061' mounted to the back frame, and FIG. 17b shows the preferred form rearward cover section prior to mounting to the frame. In this form, the sections 2061a, 2061b form part of a unitary integrally moulded rearward cover section 2061' that is mounted to the frame and to the front cover section 2061.

Figure 18A:
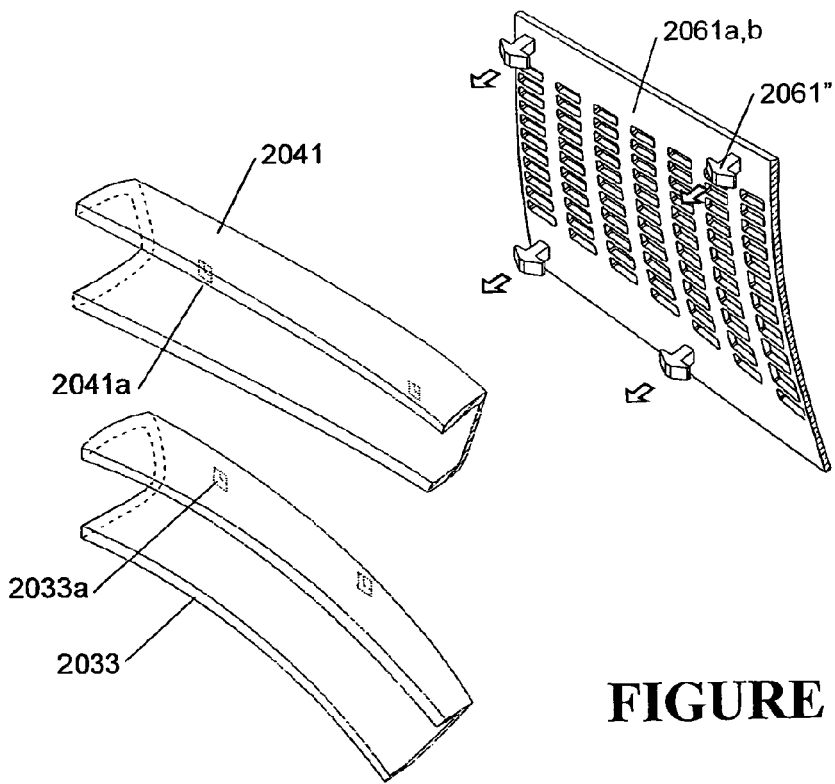
FIG. 18a is a view of a preferred form mounting arrangement of the bow tie feature to the back portion of the chair of FIG. 4.

As can be seen in FIG. 17b, the rearward cover section 2061' has a plurality of spaced apart attachment features 2061" that are integrally moulded as part of the rearward cover section 2061'. The features 2061" have enlarged heads that are received in slots 2033a, 2041a in frame members 2033, 2041 as shown in FIG. 18a, and maintain the cover in position on the frame members.

Figure 18B:
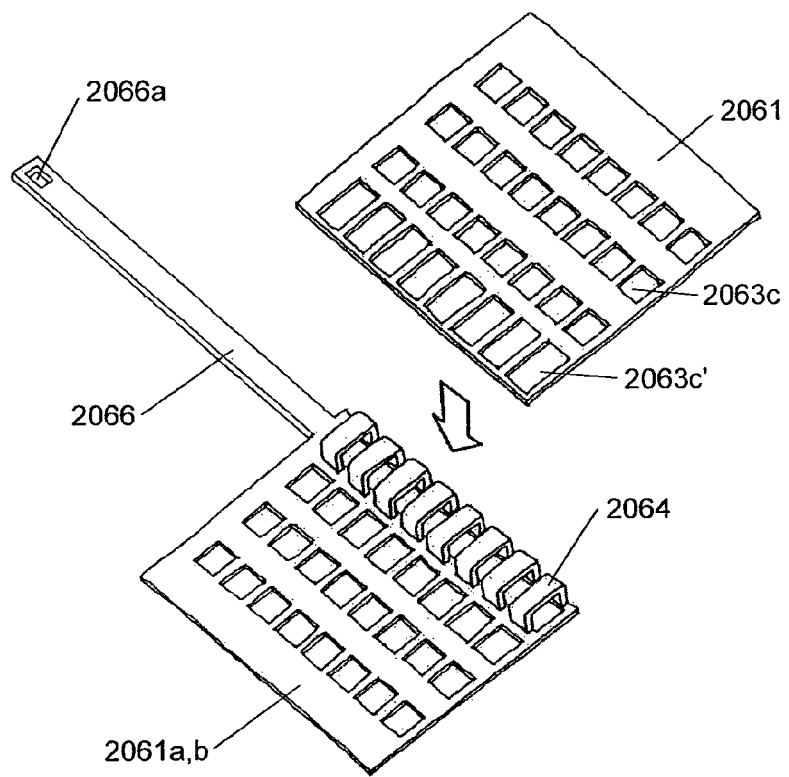
FIG. 18b is a view of a first step in a preferred form mounting method for the cover in the recessed sections and the rear cover that forms the bow tie feature.
Figure 18C:
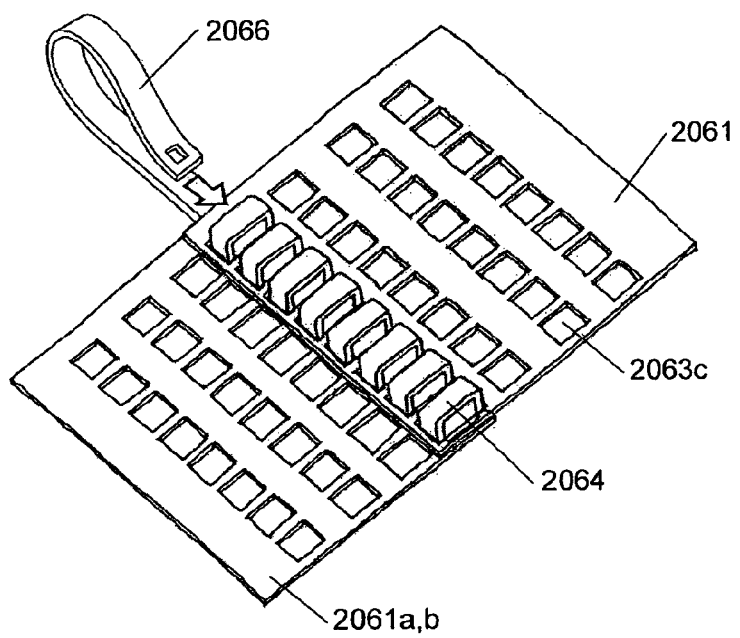
FIG. 18c is a view of a second step in a preferred form mounting method for the cover in the recessed sections and the rear cover that forms the bow tie feature.
Figure 18D:
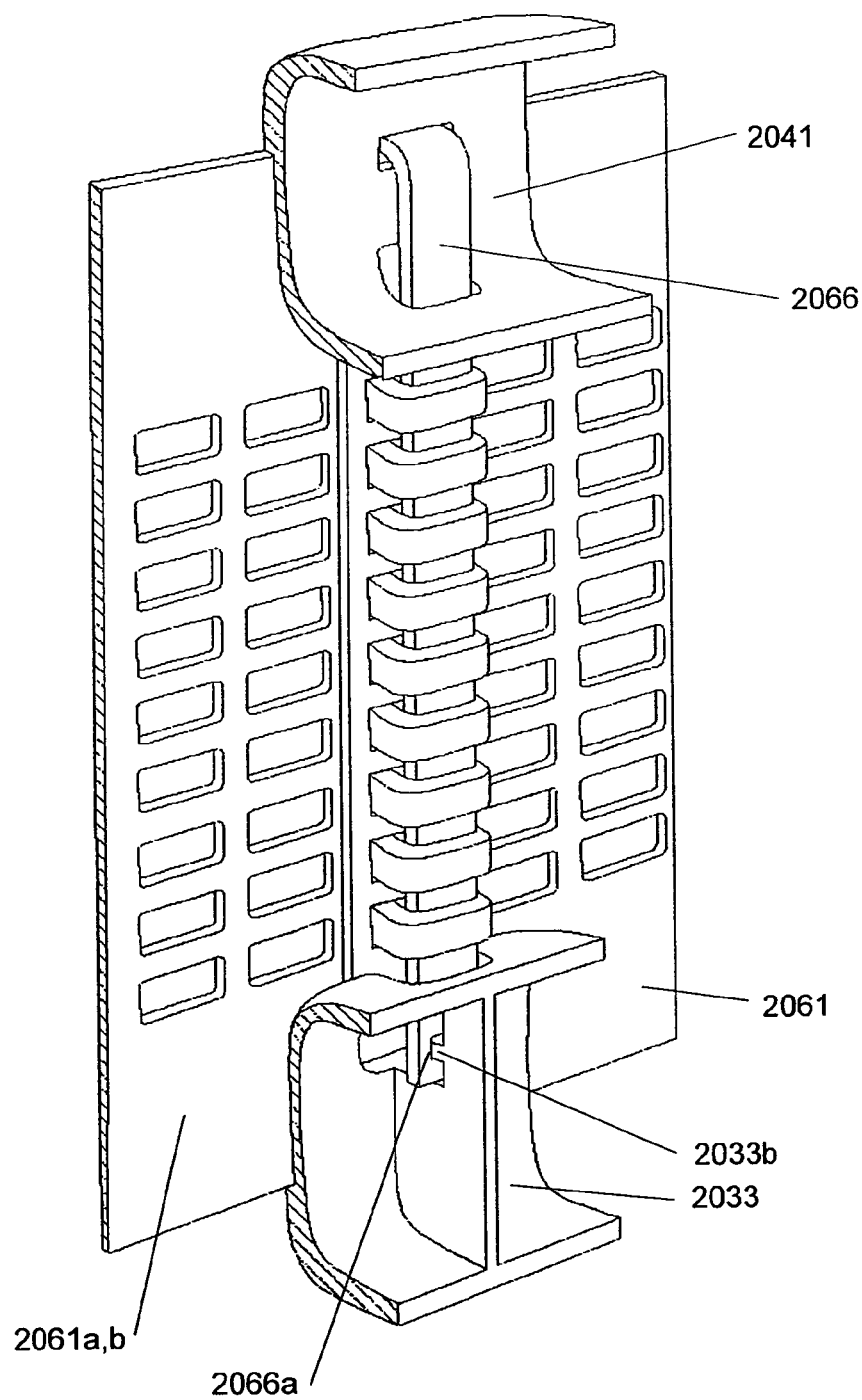
FIG. 18d is a view of a third step in a preferred form mounting method for the cover in the recessed sections and the rear cover that forms the bow tie feature.

FIGS. 18b to 18d shows a suitable attachment method for attaching the rear cover section 2061' to the front part 2061 of the cover. In the recessed regions, the side portions of the cover are not substantially solid. Rather, the apertures 2063c extend substantially to the edge of the cover. On each side, the cover is provided with one row of apertures 2063c' that are elongated, and are configured to receive connectors 2064 on the sections 2061a, 2061b. To attach each section to the cover, the connectors 2064 are positioned through the corresponding apertures 2063c', and a retainer 2066 is inserted through the connectors. In the form shown, the retainer is an integrally moulded part of the rear cover section 2061', although it could be a separate component. As can be seen in FIG. 18d, the frame members 2033, 2041 are provided with apertures for receipt of the retainer 2066. An engagement projection 2033b is provided in frame component 2033, and is received in an aperture 2066a in the retainer, to maintain the front part of the cover in connection with the rear part of the cover and the retainer in position through the members 2064. Other than the connections of the retainer 2066 to the frame members 2041, 2033, the cover is unsupported in the side recessed regions.

The cover and sections 2061a, 2061b will be assembled so the connectors 2064 and retainers 2066 are on the inside of the cover. It will be appreciated that the connectors could instead be moulded as part of the cover, and the apertures 2063c' moulded as part of the sections 2061a, 2061b. On one side of the cover, the connectors may be moulded as part of the front cover section, and on the other side the connectors may be moulded as part of the rear cover section.

Figure 19:
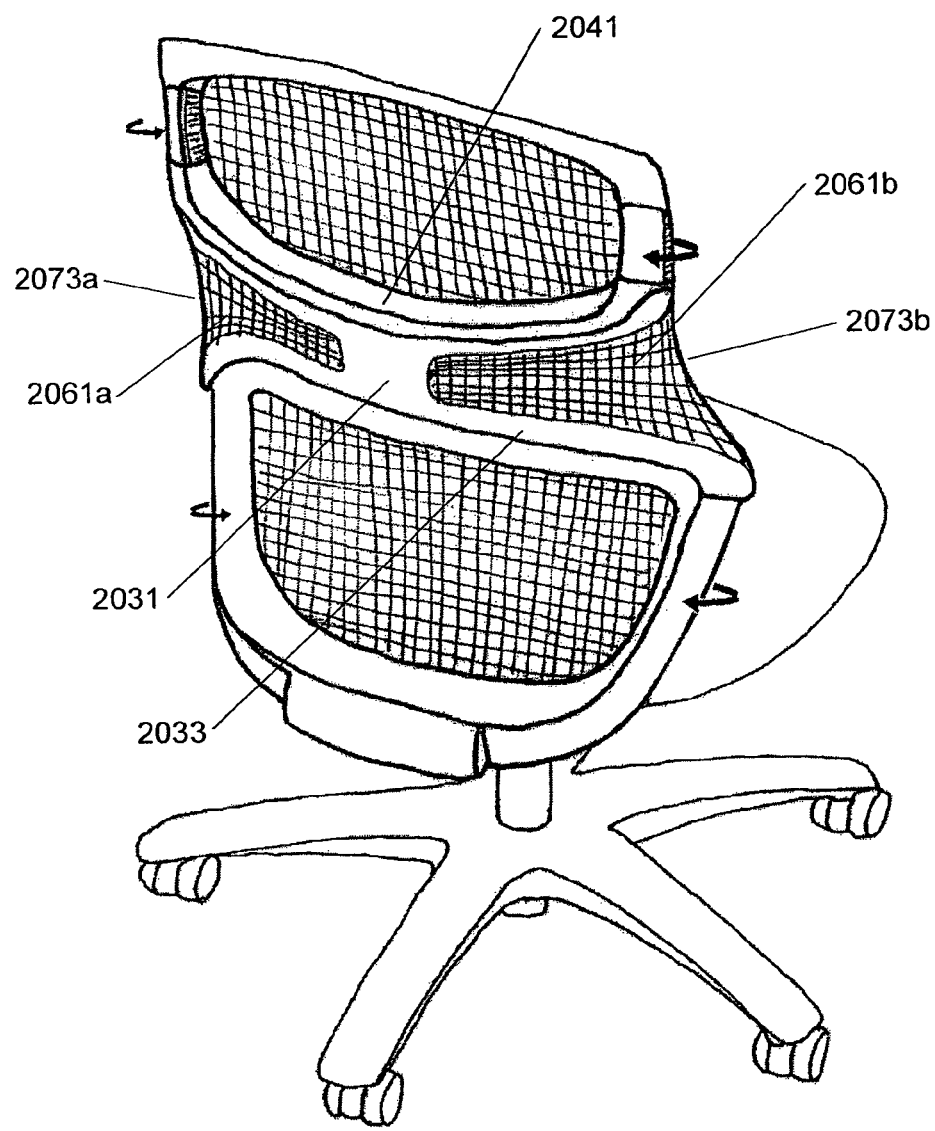
FIG. 19 is a rear overhead perspective view of the back portion of the chair of FIG. 4, showing a preferred form mounting arrangement of the cover/skin to the back frame.

FIG. 19 shows an alternative form in which the rear cover sections 2061a, 2061b are separate components.

Figure 9:
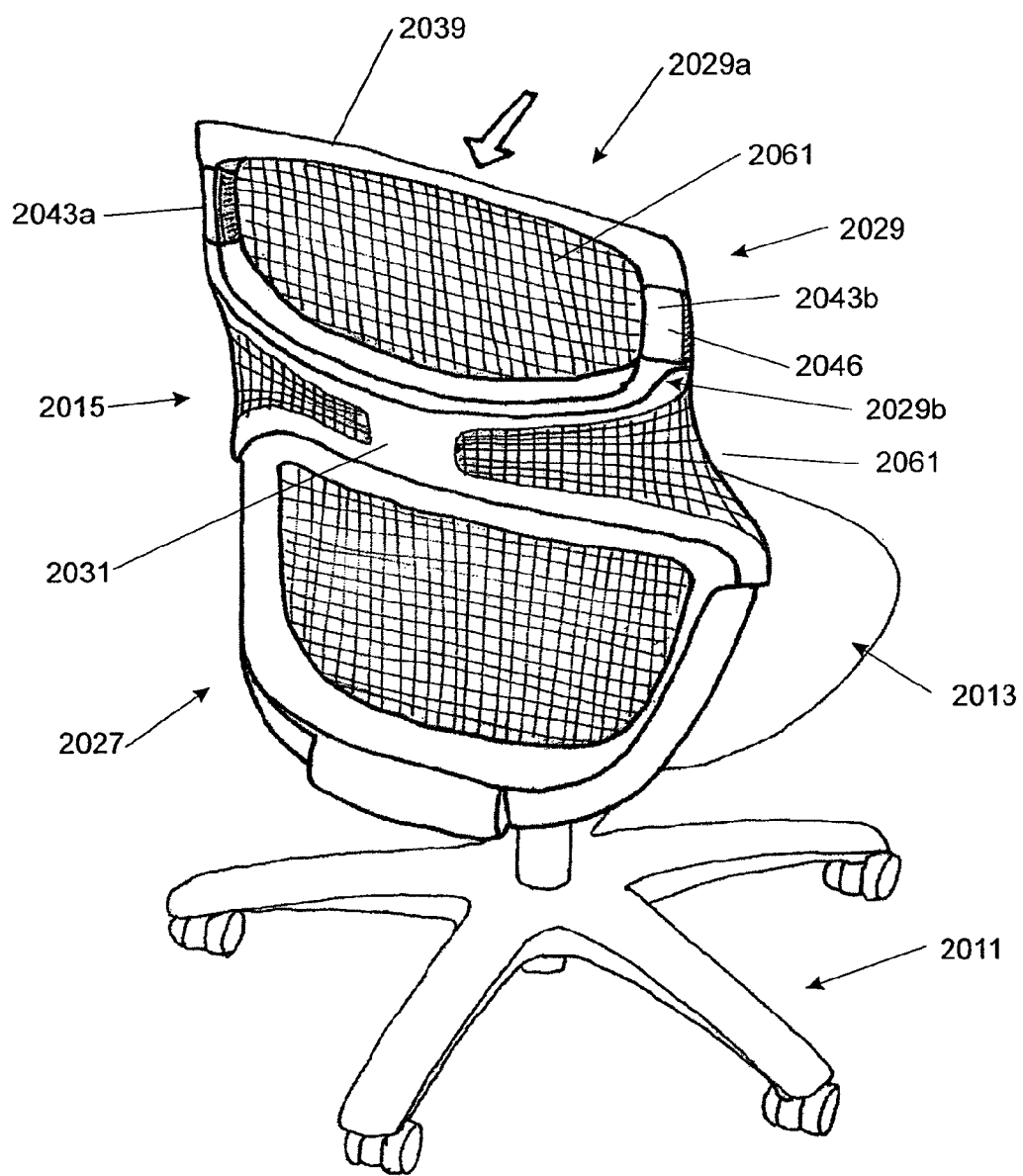
FIG. 9 is a rear overhead perspective view of the back portion of the chair of FIG. 4, showing an upper section in an upright configuration.
Figure 10:
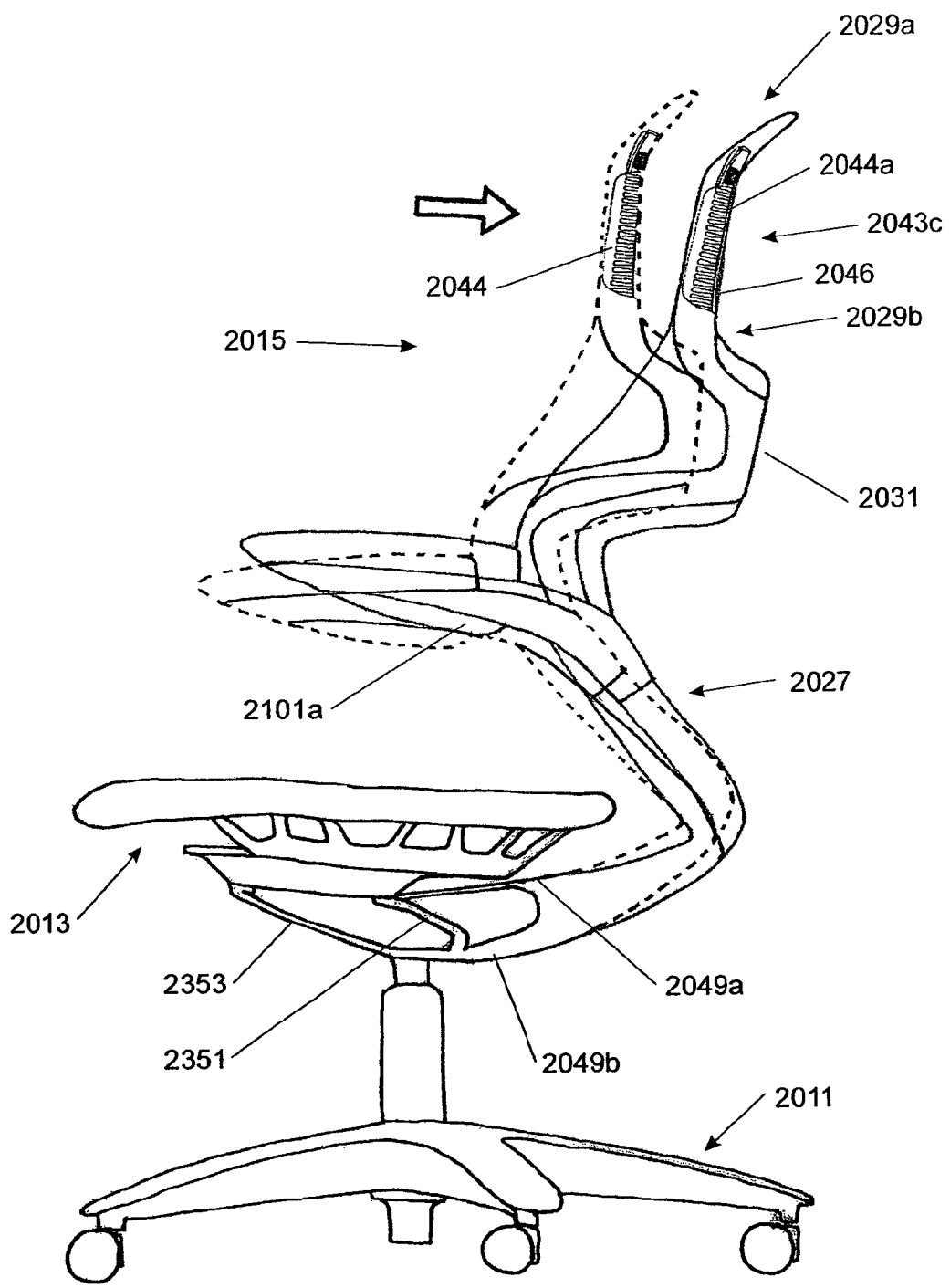
FIG. 10 is a side elevation view of the back portion of the chair of FIG. 4, showing the upper section in the upright configuration.
Figure 11:
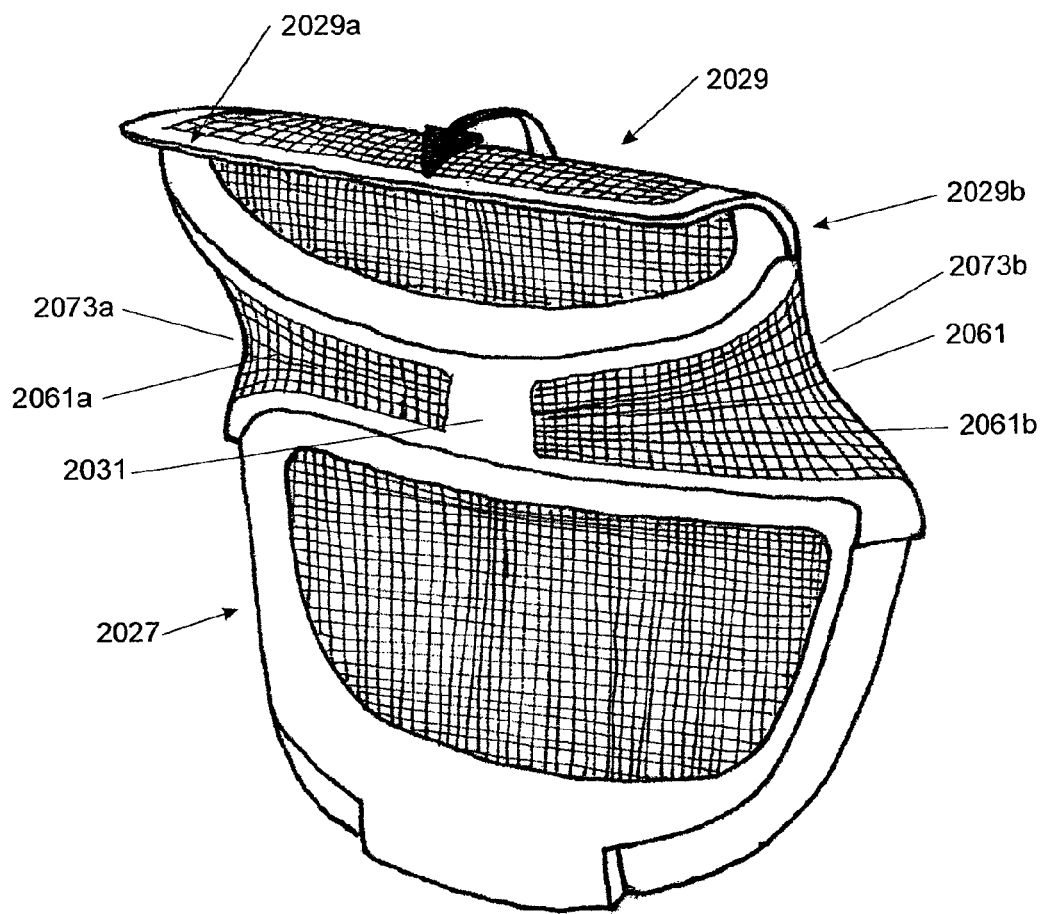
FIG. 11 is a rear overhead perspective view of the back portion of the chair of FIG. 4, showing the upper section in a folded configuration.
Figure 12A:
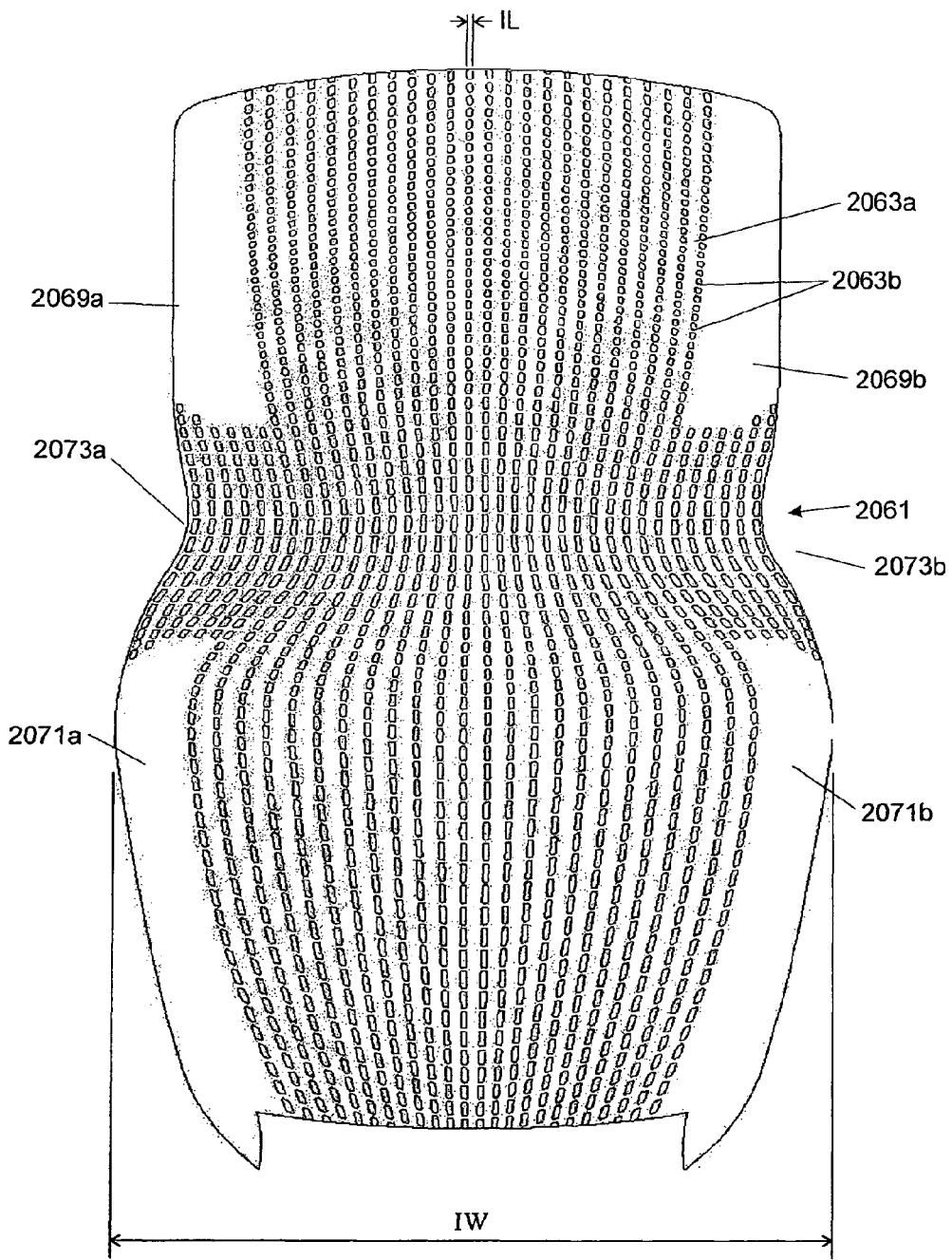
FIG. 12a is a front view of a preferred form back cover/skin of the chair of FIG. 4, in an as-moulded configuration, the skin being an article made in accordance with the present invention.
Figure 12B:
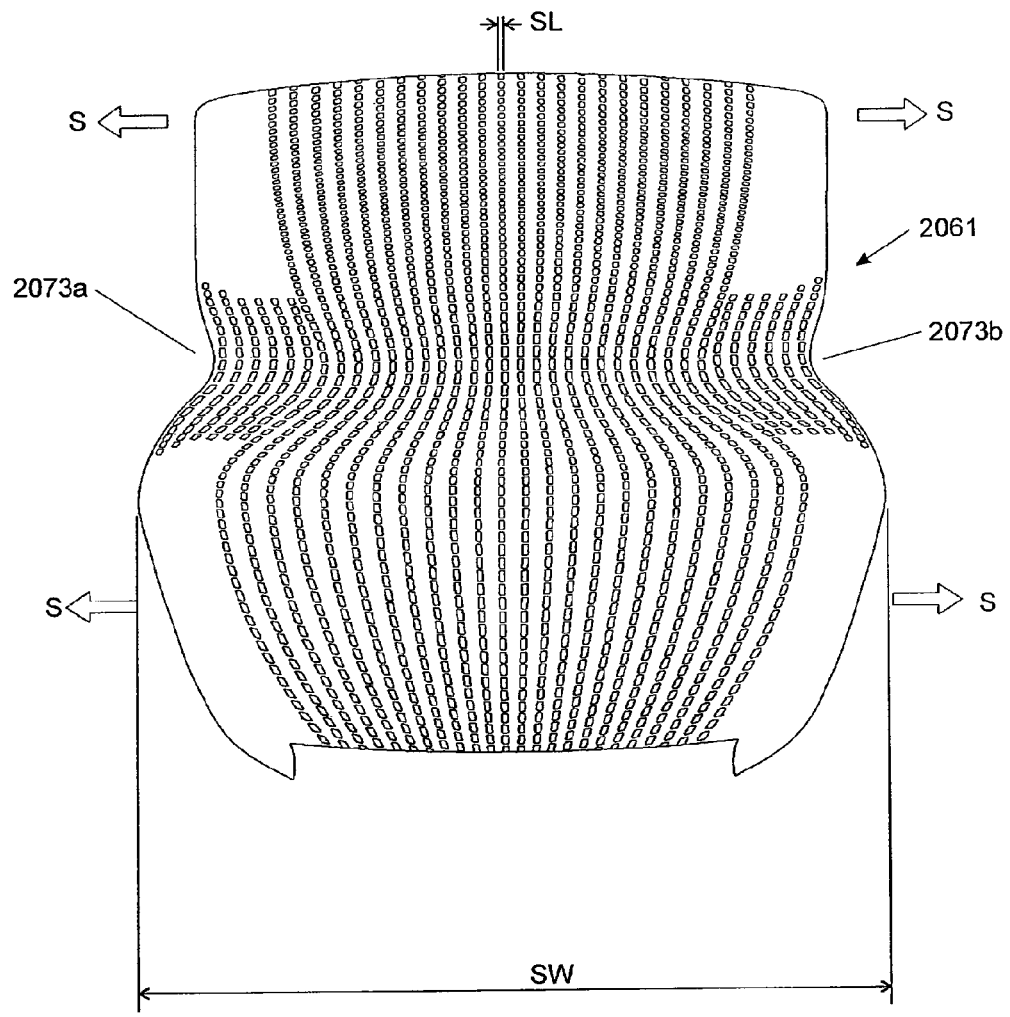
FIG. 12b is a front view of the back cover/skin of FIG. 12a, in a stretched configuration such that strain orientation occurs.
Figure 12C:
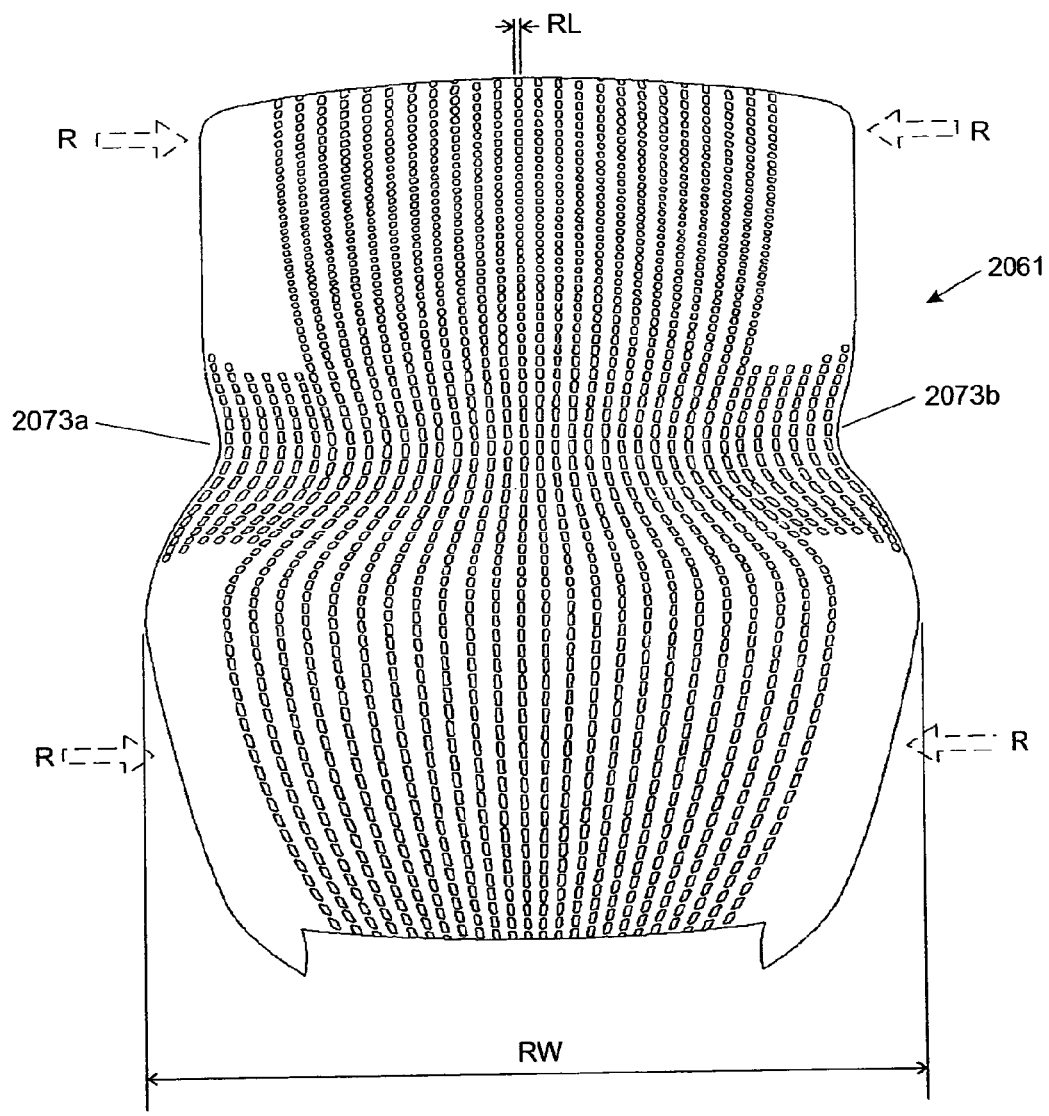
FIG. 12c is a front view of the back cover/skin of FIG. 12a, in a relaxed configuration.
Figure 13C:
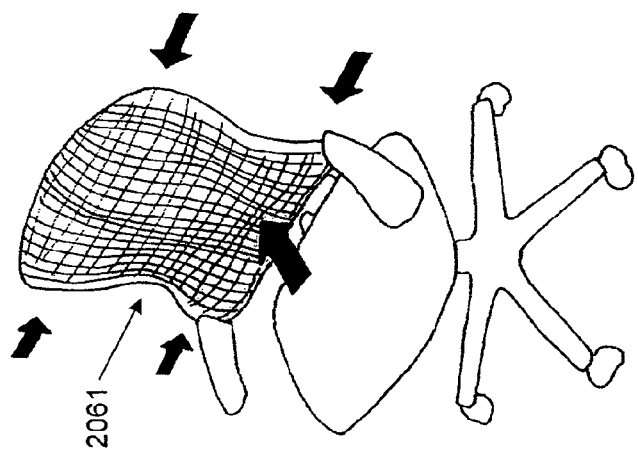
FIGS. 13a, 13b, and 13c are schematic front overhead perspective views of a preferred method of mounting the cover/skin of FIG. 12a-c to the back frame, with the skin in the as-moulded, stretched, and relaxed configurations respectively.
Figure 13B:
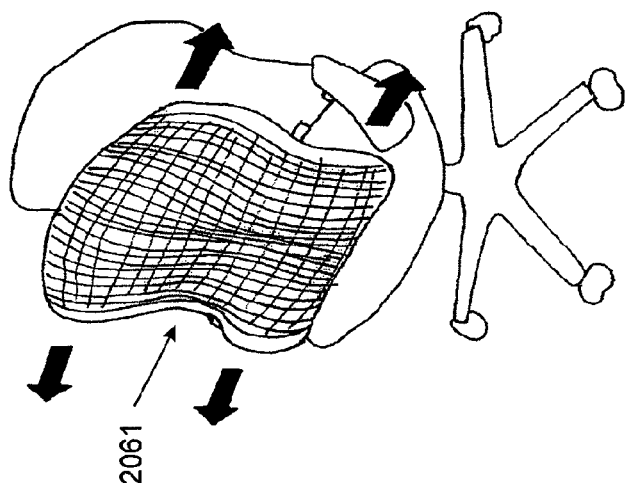
Figure 13A:
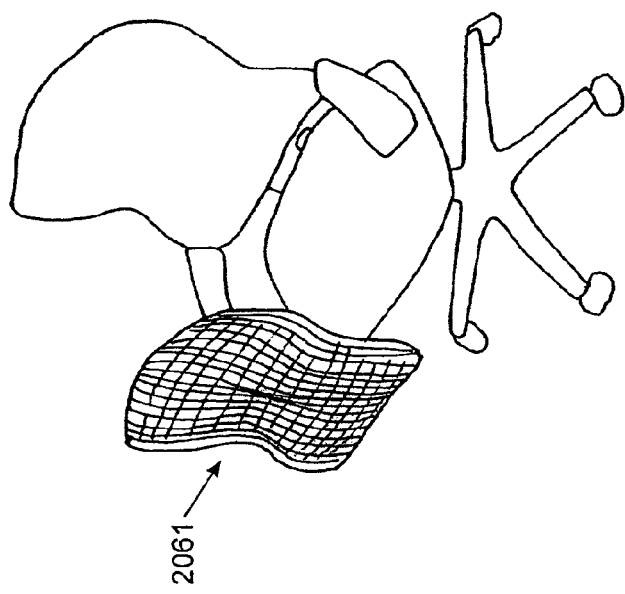

Referring to FIGS. 9 to 11, the upper portion 2029 of the back frame may comprises an upper section 2029a that is adapted to be selectively folded rearwardly relative to a remainder 2029b of the upper portion, to reduce the overall vertical height of the back portion. The reduction in the overall vertical height of the back portion enables an adult occupant to sit sideways in the chair with an upper end of the back portion positioned under their armpit and/or to rest their arm on the upper end of the back portion when sitting in that position.

Experimental Results

The following table shows the results of trials carried out on test strips of Hytrel 4069 to show indicative dimensional changes when the component is strain oriented. Each test strip consisted of an elongate member of about 100 mm long, extending between two tabs. The elongate member had a cross-sectional depth of about 3.25 mm and a cross-sectional width of about 2.2 mm. The tabs were gripped and the elongate member stretched along its length. The first column shows the total lengths to which the members were stretched, as a percentage of their initial lengths. The second column shows the post-stretching relaxation lengths of the members, as a percentage of their initial lengths. The third column shows the post-relaxation cross-sectional width and depth of each member, as a percentage of the original width and depth. The fourth column shows the overall post-relaxation cross-sectional area of each member, as a percentage of the original cross-sectional area.

| Stretched length, percentage of original length | Length at rest (post-stretching relaxation length), percentage of original length | Depth and width percentage reduction from original | Cross section percentage reduction from original |
|---|---|---|---|
| 400% | 204.00% | 70.01% | 49.02% |
| 500% | 269.00% | 60.97% | 37.17% |
| 600% | 342.00% | 54.07% | 29.24% |
| 700% | 383.00% | 51.10% | 26.11% |
| 800% | 532.00% | 43.36% | 18.80% |

The following tables show the expected changes in dimensions for the transverse elongate members of the preferred embodiment moulded article described above (and shown in the Figures), when the article is stretched transversely so that the transverse members are stretched.

Pre-stretching size

| Length (mm) | Width (mm) | Depth (mm) | Cross section (sq mm) |
|---|---|---|---|
| 3.33 | 2 | 2.5 | 5 |

Post-stretching relaxation size

| Length (mm) | Width (mm) | Depth (mm) | Cross section (sq mm) |
|---|---|---|---|
| 11.4 | 1.1 | 1.4 | 1.5 |

| Elongation, percentage of original length | Length at rest, percentage of original | Depth and width percentage reduction from original | Cross section percentage reduction from original |
|---|---|---|---|
| 600% | 342.00% | 54.07% | 29.24% |

It can be seen that when stretching the transverse members to 600% of their initial lengths, the transverse members are expected to have a final length of 11.4 mm. However, in practice at least some of the transverse members have a final length of about 7 mm. That difference is caused by the radii between each transverse and longitudinal member, and also is dependent on the spacing between adjacent transverse members.

A number of tests were carried out to determine optimum moulding conditions for strain orientation of HYTREL 4069 in a formed sheet article. Samples were moulded as mesh sheets using different parameters, and the formed articles were then stretched to determine whether they would elongate a sufficient amount to provide a useful strain orientated article. The results in the following table are for moulding a mesh sheet having a material volume of 58 cm$^3$.

| Sample number | Melt temperatures, nozzle end to hopper end (° C.) | Injection pressure (MPa) | Fill time (seconds) | Material velocity at each gate during injection (mm/sec) | Fibre failure points to 30 mm elongation (fibre start length 3.33 mm) | Fibre failure points to 40 mm elongation (fibre start length 3.33 mm) | Mould temp (° C.) |
|---|---|---|---|---|---|---|---|
| 156 | 230/225 | 84 | 3.00 | 688 | 14, 14, 15, 17, 27 | 33, 36 all fail | 40 |
| 35 | 235/220 | 84 | 3.00 | 688 | 17, 18, 18, 18 | Not measured | 70 |
| 152 | 230/225 | 95 | 2.00 | 1032 | 18, 18, 21, 26, | 33, 34, 34, 35 all fail | 40 |
| 40 | 265/250 | 75 | 2.30 | 897 | 19, 21, 23, 30 | Not measured | 70 |
| 39 | 255/240 | 75 | 2.30 | 897 | 14, 19, 20, 30 | Not measured | 70 |
| 94 | 240/230 | 96 | 1.75 | 1179 | 22, 24 | 31, 37, 38 all fail | 70 |
| 84 | 255/240 | 88 | 1.75 | 1179 | 26, 26 | 31, 35, 35, 38 | 40 |
| 73 | 255/240 | 90 | 1.80 | 1146 | | 31, 33, 35, 37, 39 | 70 |
| 106 | 255/240 | 96 | 1.20 | 1720 | | 32, 33, 33, 33, 38, 38, 38, 39, 40 all fail | 70 |
| 70 | 255/240 | 90 | 1.90 | 1086 | | 30, 33, 35, 35, 36, 38 all fail | 70 |

The first test was based on an article moulded using recommended moulding parameters for HYTREL 4069. In the second column, the second temperature corresponds to heater $H_1$ in FIG. 1 and the first temperature corresponds to heater $H_5$ in FIG. 1. The fill time is the time in seconds taken to fill the mould with resin. The fifth column lists any members of the formed sheet article that failed when strain elongated to less than 30 mm, and the length they had reached at the time of failure. The fourth column lists any members of the formed sheet article that failed between 30 mm and 40 mm. The members started at 3.33 mm length in the formed sheet article. The sixth column shows the temperature of the mould.

The above table shows only a subset of the experimental results. Not all results were consistent, but the majority of results showed the above pattern; namely that superior elongation was achieved with an elevated melting temperature and injection velocity, reduced mould fill time and increased mould fill pressure.

The following table shows results from a trial on a larger sheet article, which has a resin volume of 573.2 cm³.

| Sample number | Melt temperature nozzle end (° C.) | Injection pressure (MPa) | Fill time (seconds) | Material velocity at each gate during injection (mm/sec) | Fibre failure points to 30 mm elongation (fibre start length 3.33 mm) | Fibre failure points to 40 mm elongation (fibre start length 3.33 mm) | Mould temp (° C.) |
|---|---|---|---|---|---|---|---|
| 6 | 255 | 131.4 | 1.40 | 1930 | 21.5, 23.7, 26, 28, 28, 28, 29.5, 29.5, 29.5, 30, 30 | Not measured | 55 |

The trials on this component were not optimised, but it can be seen that the elevated melt temperature and mould fill velocity again provides superior elongation and therefore superior strain orientation to that that was encountered for the smaller part with recommended HYTREL moulding parameters. It is expected that with optimisation of the parameters, the performance results for the larger sheet article will be similar to those for the smaller sheet article.

The results in the above two tables are from trials undertaken using a hydraulic injection moulding machine. The following table shows results for a sheet article, which has a resin volume of 573.2 cm³. This trial was conducted using a fully electric injection moulding machine. By transitioning or decaying the pressure in a controlled manner over time from the injection pressure to the hold pressure, usable parts were obtained. The following table shows the parameters of one successful trial with the transitioned pressures.

| Sample number | Melt temperatures, nozzle end/hopper end (° C.) | Injection pressure (MPa) | Fill time (seconds) | Transition pressures (MPa)/times (seconds) | Hold pressure (MPa)/time (seconds) | Material velocity at each gate during injection (mm/sec) | Fibre failure points to 30 mm elongation (fibre start length 3.33 mm) | Fibre failure points to 40 mm elongation (fibre start length 3.33 mm) | Mould temp (° C.) |
|---|---|---|---|---|---|---|---|---|---|
| 10 | 255/240 | 90 | 1.32 | 45/1, 30/1, 20/1 | 10/17 | 1564 | 28 | 33, 38 | 70 |

The above describes preferred forms of the present invention, and modifications can be made thereto without departing from the scope of the present invention. For example, the formed article is described as being a cover for the back of a reclining office chair. However, it will be appreciated that such an article can readily be incorporated into different types of chairs, such as dental chairs, meeting seats, vehicle seats, stadium seats, theatre seats, aircraft or other vehicle seats for example. The supporting frame could be modified accordingly, so as to be fixed to the ground or a wall panel for example for a theatre seat.

Other example modifications to the moulding method, the resulting article, and its use are listed in the "Summary of the Invention" section.

The invention claimed is:

1. A method of injection moulding a polymeric resin to form an article that is suitable for strain orientation, the method comprising:

providing a polymeric resin comprising a thermoplastic polyester elastomer;

heating the resin to form a molten resin at a temperature of at least 240° C.;

injecting the molten resin into a mould of a moulding apparatus to substantially fill the mould and form an article, wherein at least part of the article is a sheet part with a plurality of members that are integrally formed into the sheet part, with apertures provided between at least some of the members of the sheet part to form a mesh; and removing the formed article from the mould, wherein at least the sheet part of the article is suitable for strain orientation.

2. A method according to claim 1, wherein the thermoplastic polyester elastomer comprises a block copolymer.

3. A method according to claim 2, wherein the block copolymer comprises a hard segment and a soft segment.

4. A method according to claim 3, wherein the thermoplastic polyester elastomer is a block copolymer of polybutylene terephthalate and polyether.

5. A method according to claim 1, wherein the resin is selected such that the formed article has a hardness in the range of 30 D to 55 D when tested in accordance with ASTM D2240.

6. A method according to claim 1, wherein the resin is heated to a temperature of between 240° C. and 265° C.

7. A method according to claim 6, wherein the resin is heated to a temperature of between 240° C. and 255° C.

8. A method according to claim 7, wherein the resin is heated to a temperature of between 245° C. and 255° C.

9. A method according to claim 8, wherein the resin is heated to a temperature of between 250° C. and 255° C.

10. A method according to claim 9, wherein the resin is heated to a temperature of 255° C.

11. A method according to claim 1, comprising heating the mould to a temperature of at least 50° C.

12. A method according to claim 1, wherein the step of injecting the molten resin comprises substantially filling the mould using an injection time of 2.0 seconds or less.

13. A method according to claim 1, wherein the mould comprises at least one gate, and the step of injecting the molten resin comprises injecting at least a major part of the molten resin with a velocity of at least 1000 mm/second at the or each gate.

14. A method according to claim 13, wherein the step of injecting the molten resin comprises injecting at least a major part of the molten resin with a velocity of between 1000 mm/second and 2000 mm/second at the or each gate.

15. A method according to claim 1, wherein the step of injecting the molten resin comprises using an injection pressure of at least 80 MPa to substantially fill the mould.

16. A method according to claim 15, wherein the step of injecting the molten resin comprises using an injection pressure of between 120 MPa and 132 MPa to substantially fill the mould.

17. A method according to claim 1, wherein the moulding apparatus comprises a nozzle to inject the molten resin into the mould, and a heater adjacent the nozzle, wherein the method comprises passing the molten resin through the nozzle at a temperature of at least 240° C.

18. A method according to claim 17, comprising passing the molten resin through the nozzle at a temperature of between 240° C. and 265° C.

19. A method according to claim 18, comprising passing the molten resin through the nozzle at a temperature of between 240° C. and 255° C.

20. A method according to claim 19, comprising passing the molten resin through the nozzle at a temperature of between 245° C. and 255° C.

21. A method according to claim 20, comprising passing the molten resin through the nozzle at a temperature of between 250° C. and 255° C.

22. A method according to claim 21, comprising passing the molten resin through the nozzle at a temperature of 255° C.

23. A method according to claim 1, wherein the method comprises holding the resin in the mould at a hold pressure during curing of the article, wherein the hold pressure is lower than an injection pressure used during the step of injecting the molten resin.

24. A method according to claim 23, wherein the resin is held in the mould at a hold pressure of less than 22 MPa.

25. A method according to claim 23, wherein the resin pressure is transitioned in a controlled manner from the higher injection pressure to the lower hold pressure, to minimise movement of resin into or out of the mould during curing of the article.

26. A method according to claim 1, comprising injecting the resin into the mould from points adjacent opposite ends of a mould cavity such that the sheet part of the formed article has a plurality of elongate members extending in a first generally longitudinal direction that is aligned with the direction between the opposite ends of the mould cavity, and a plurality of elongate members extending in a second direction that is generally transverse to the first generally longitudinal direction, wherein the generally transversely extending elongate members differ from the generally longitudinally extending elongate members.

27. A method according to claim 1, comprising forming at least some of the members of the formed article with a cross-sectional dimension of 2.5 mm or less.

28. A method of assembling a support, comprising:
providing a frame;
injection moulding a polymeric resin to form an article that is suitable for strain orientation, the injection moulding comprising:
providing a polymeric resin comprising a thermoplastic polyester elastomer;
heating the resin to form a molten resin at a temperature of at least 240° C.;
injecting the molten resin into a mould of a moulding apparatus to substantially fill the mould and form an article, wherein at least part of the article is a sheet part with a plurality of members that are integrally formed into the sheet part, with apertures provided between at least some of the members of the sheet part to form a mesh; and
removing the formed article from the mould, wherein at least the sheet part of the article is suitable for strain orientation; wherein the formed article has an as moulded dimension less than a corresponding dimension of the frame;
stretching at least part of the sheet part of the formed article so that the formed article has a stretched dimension greater than the corresponding dimension of the frame and such that strain orientation of at least part of the sheet part of the formed article occurs;
relaxing the at least part the sheet part of the formed article so that the formed article has a post-relaxation dimension between the as moulded dimension and the stretched dimension; and
supporting the formed article from the frame after the step of relaxing.

29. A method according to claim 28, wherein the frame comprises an opening that is at least partly bounded by frame members, and the method comprises supporting the formed article from the frame with part of the formed article extending across the opening, to form a compliant suspended support surface.

30. A method according to claim 28, wherein the step of stretching at least part of the sheet part of the formed article comprises stretching said at least part of the sheet part to between 5 and 10 times an as-molded dimension thereof.

31. A method of forming a support surface for a chair, the method comprising:
providing a polymeric resin comprising a thermoplastic polyester elastomer;
heating the resin to form a molten resin at a temperature of at least 240° C.;
injecting the molten resin into a mould of a moulding apparatus to substantially fill the mould and form an article, wherein at least part of the article is a sheet part with a plurality of members that are integrally formed into the sheet part, with apertures provided between at least some of the members of the sheet part to form a mesh; and
removing the formed article from the mould, wherein at least the sheet part of the article is suitable for strain orientation, and wherein the formed article is a support surface for a chair.

32. A method of injection moulding a polymeric resin to form an article that is suitable for strain orientation, the method comprising:
providing a polymeric resin comprising a thermoplastic polyester elastomer;
heating the resin to form a molten resin at a temperature of between 240° C. and 260° C.;
injecting the molten resin into a mould of a moulding apparatus through a nozzle to substantially fill the mould to form an article, wherein the mould comprises at least one gate for delivering resin into a part of the mould where the article is to be formed, wherein the mould is at a temperature of at least 50° C., wherein the step of injecting comprises passing the molten resin through the nozzle at a temperature of between 240° C. and 260° C., and wherein the step of injecting comprises injecting at least a major part of the molten resin with a velocity of between 1000 mm/second and 2000 mm/second at the or each gate;

wherein at least part of the article is a sheet part with a plurality of members that are integrally formed into the sheet part, with apertures provided between at least some of the members of the sheet part to form a mesh, wherein the method comprises holding the resin in the mould at a hold pressure of less than 22 MPa during curing of the article; and removing the formed article from the mould, wherein at least the sheet part of the article is suitable for strain orientation, and wherein the formed article is a support surface to be supported from a frame of a chair.

33. A method according to claim 32, wherein the thermoplastic polyester elastomer comprises a block copolymer, wherein the block copolymer comprises a hard segment and a soft segment, and wherein the thermoplastic polyester elastomer is a block copolymer of polybutylene terephthalate and polyether.

34. A method according to claim 33, wherein the resin is selected such that the formed article has a hardness in the range of 30 D to 55 D when tested in accordance with ASTM D2240.

* * * * *